United States Patent [19]
Sherman et al.

[11] Patent Number: 5,271,677
[45] Date of Patent: Dec. 21, 1993

[54] METHOD FOR ELIMINATING WHIRL INSTABILITY IN A GAS SUPPORTED BEARING

[75] Inventors: Randy J. Sherman, Phoenix, Ariz.; August O. Weilbach, LaHabra, Calif.; Derald F. Hanson; C. Dwight Smith, both of Phoenix, Ariz.

[73] Assignee: Lincoln Laser Company, Phoenix, Ariz.

[21] Appl. No.: 952,600

[22] Filed: Sep. 28, 1992

Related U.S. Application Data

[60] Division of Ser. No. 752,017, Aug. 29, 1991, Pat. No. 5,181,783, which is a continuation-in-part of Ser. No. 705,547, May 24, 1991, abandoned, which is a continuation of Ser. No. 568,416, Jul. 16, 1990, Pat. No. 5,019,738.

[51] Int. Cl.⁵ .................................... F16C 32/06
[52] U.S. Cl. .................................... 384/114; 384/100; 384/115; 384/118
[58] Field of Search ............... 384/100, 114, 115, 118, 384/120, 111, 113, 107

[56] References Cited

U.S. PATENT DOCUMENTS

| | | | |
|---|---|---|---|
| 3,101,980 | 8/1963 | Love | 384/114 |
| 3,132,906 | 5/1964 | Sternlicht | 384/114 |
| 4,222,617 | 9/1980 | Romberg | 384/100 X |
| 4,596,474 | 6/1986 | Van Roemburg | 384/100 |
| 4,643,592 | 2/1987 | Lewis et al. | 384/100 |
| 4,767,223 | 8/1988 | Goodwin | 384/114 |
| 4,798,480 | 1/1989 | Van Beek | 384/114 |

Primary Examiner—Thomas R. Hannon
Attorney, Agent, or Firm—Cahill, Sutton & Thomas

[57] ABSTRACT

A gas supported bearing includes a first stationary bearing element having a longitudinal axis and a first bearing surface. A second rotating bearing element is coaxially aligned with respect to the first bearing element and includes a second bearing surface. A pneumatic load ramp is formed in one of the bearing surfaces to apply an asymmetric load to either bearing element to eliminate bearing whirl instability.

19 Claims, 11 Drawing Sheets

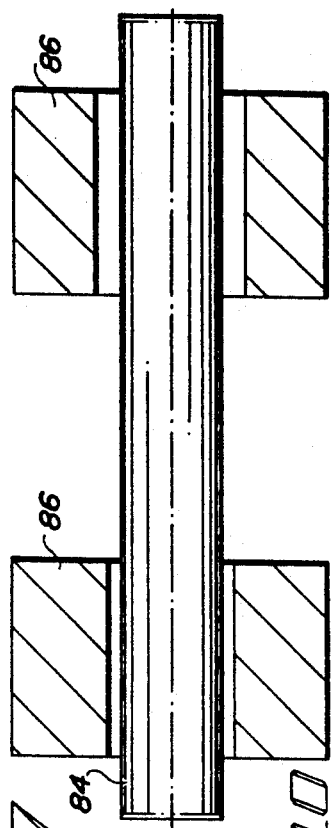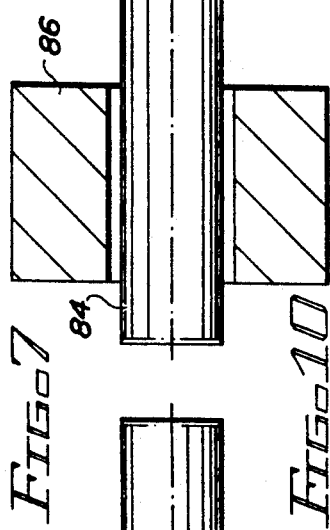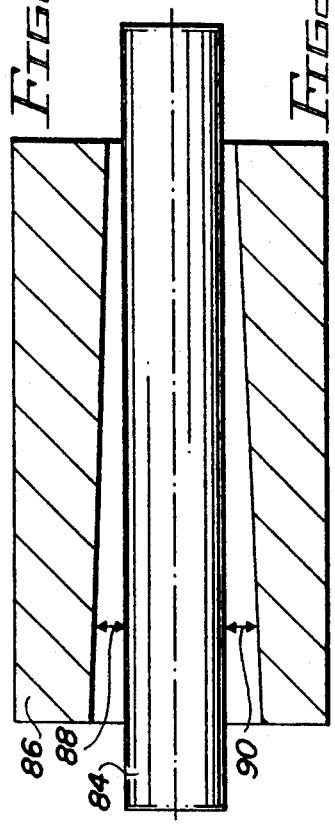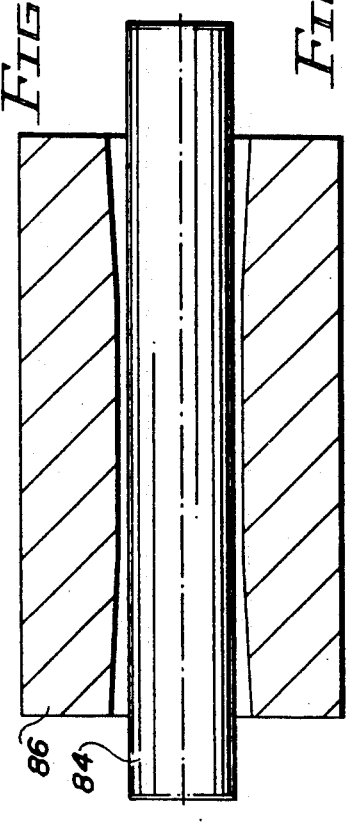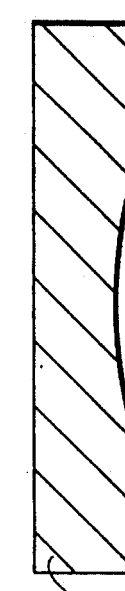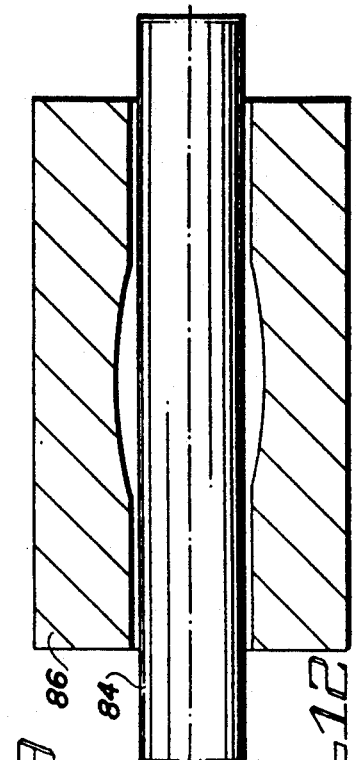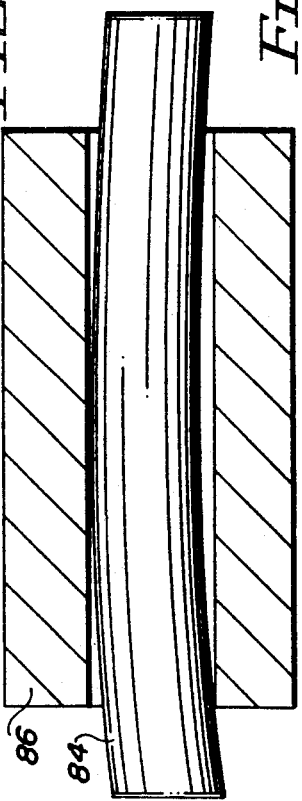

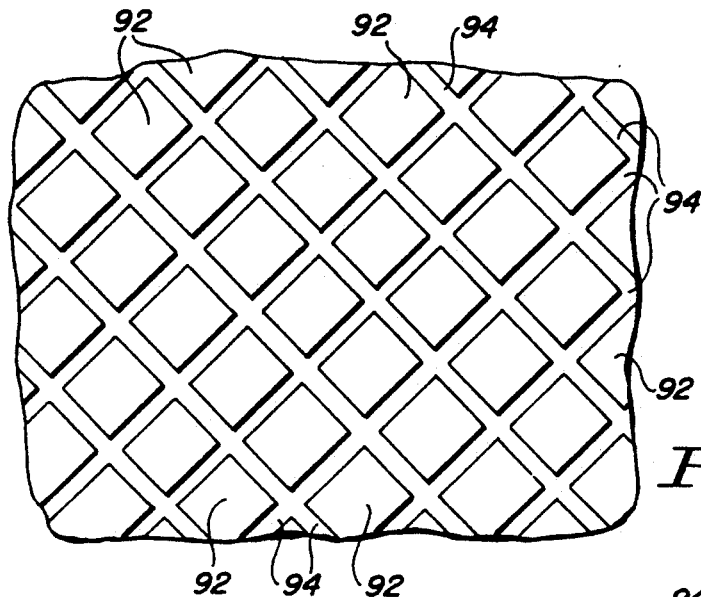
FIG_16A
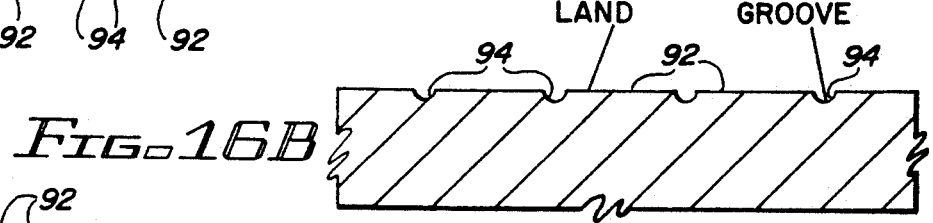
FIG_16B
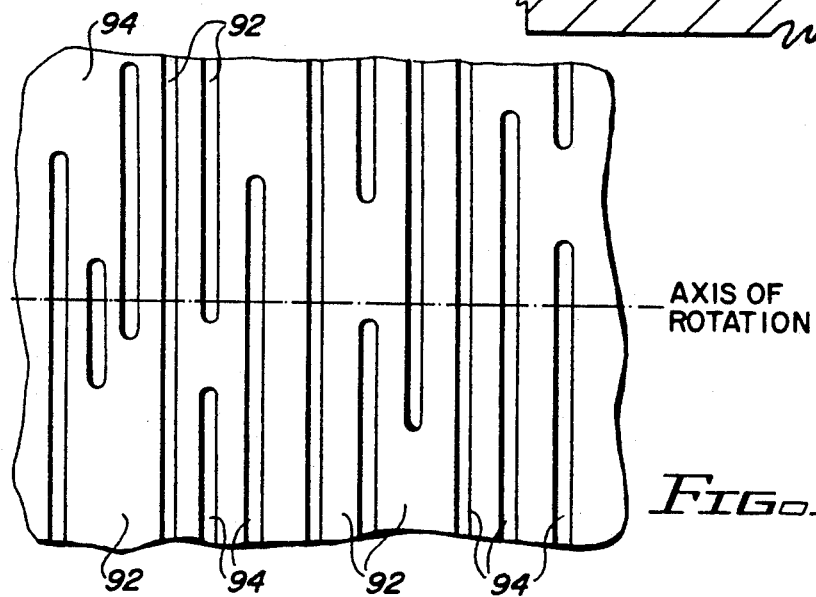
FIG_17A
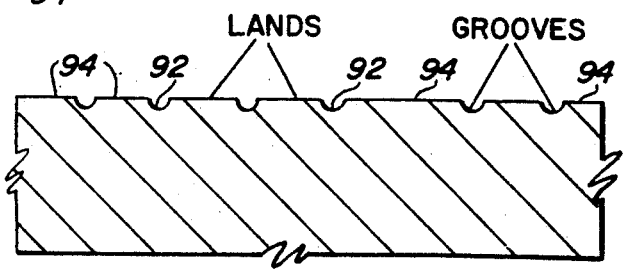
FIG_17B

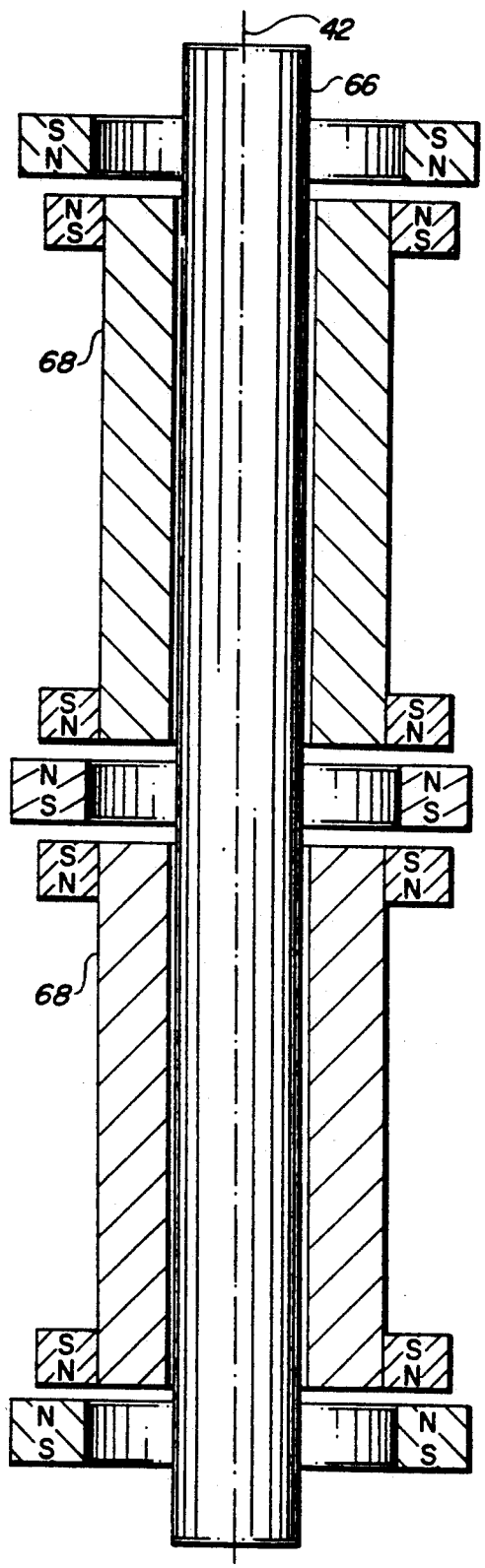
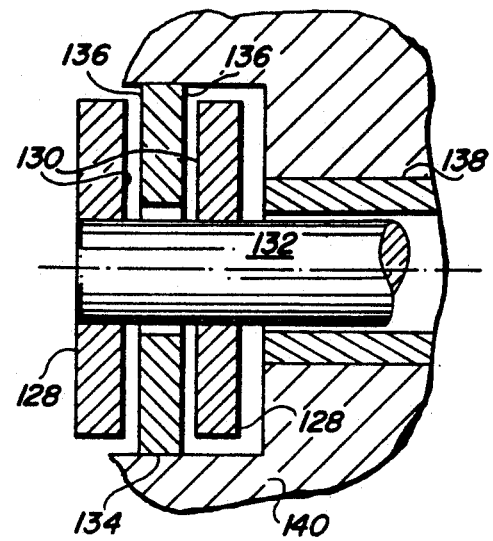
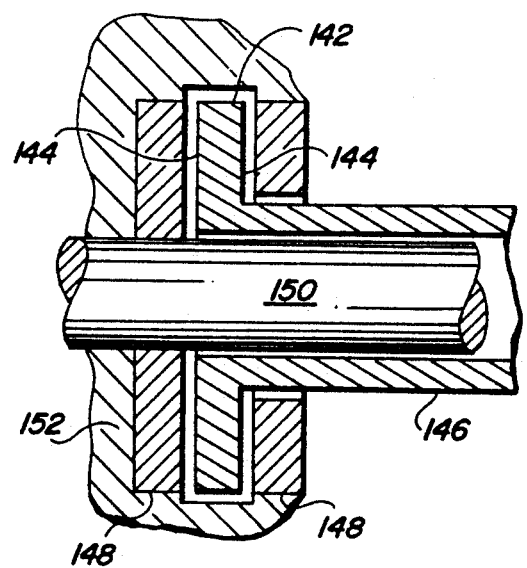
FIG.-18
FIG.-21B
FIG.-21C

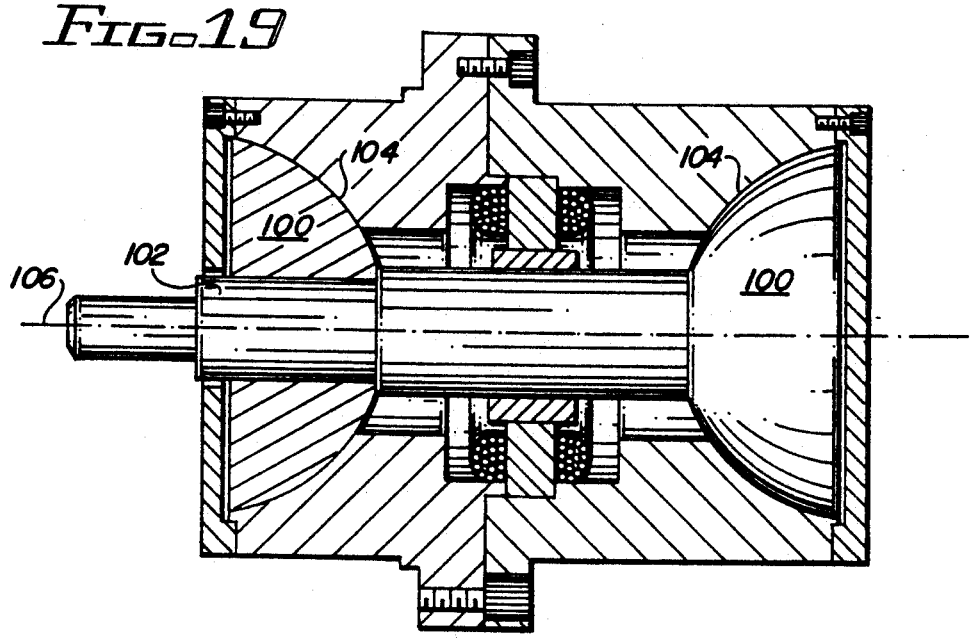
FIG_19
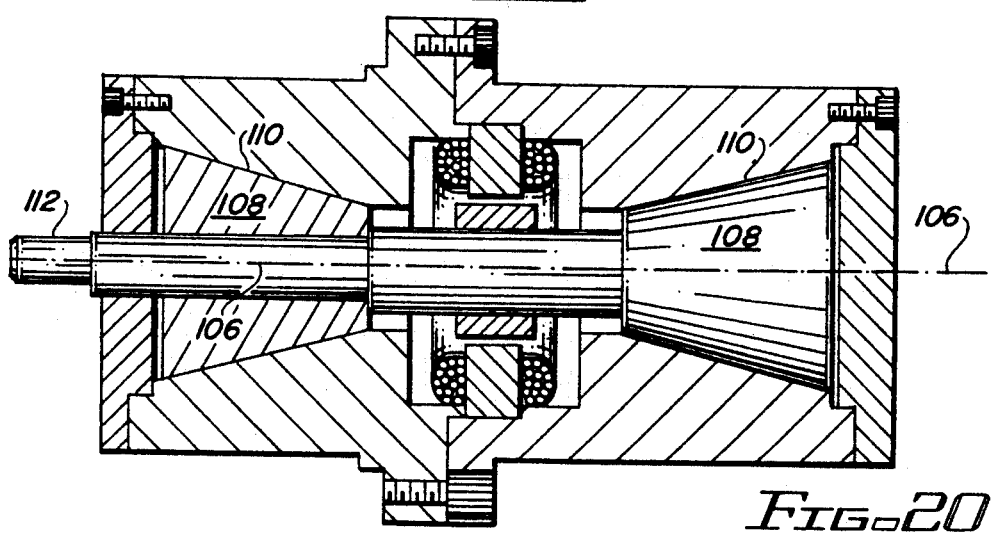
FIG_20
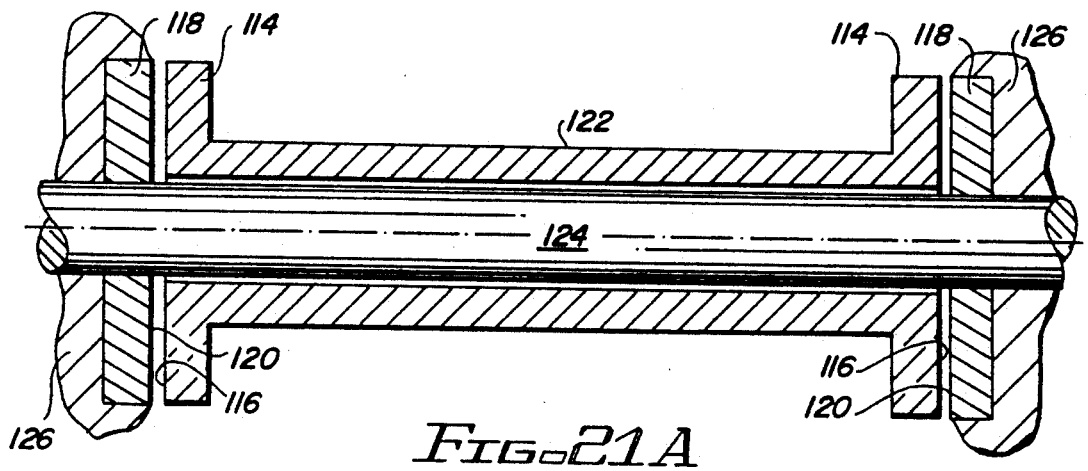
FIG_21A

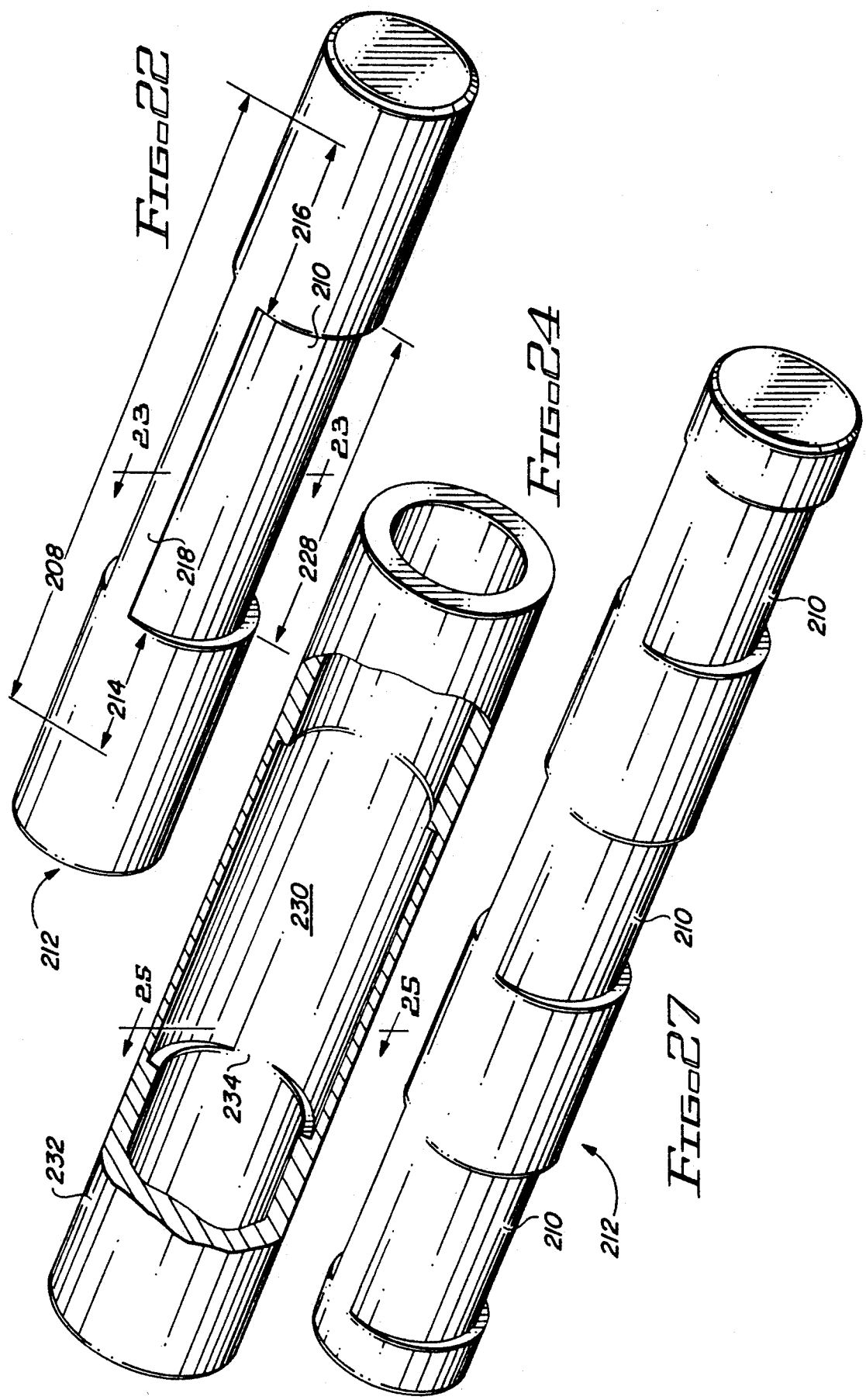

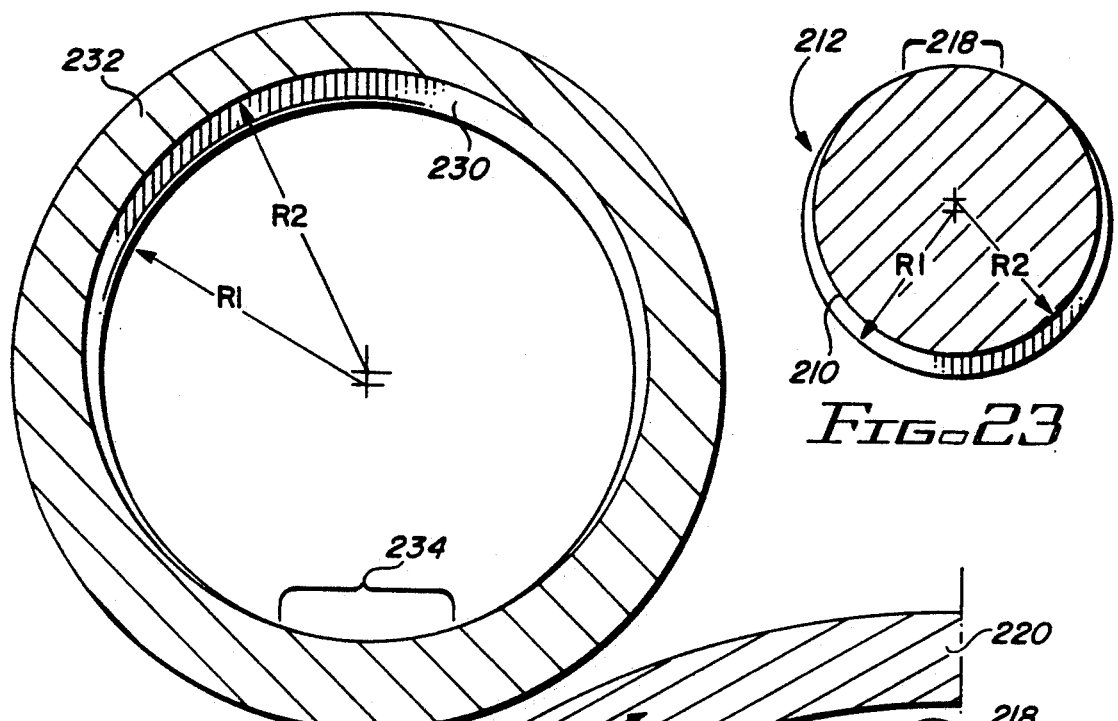
FIG. 23
FIG. 25
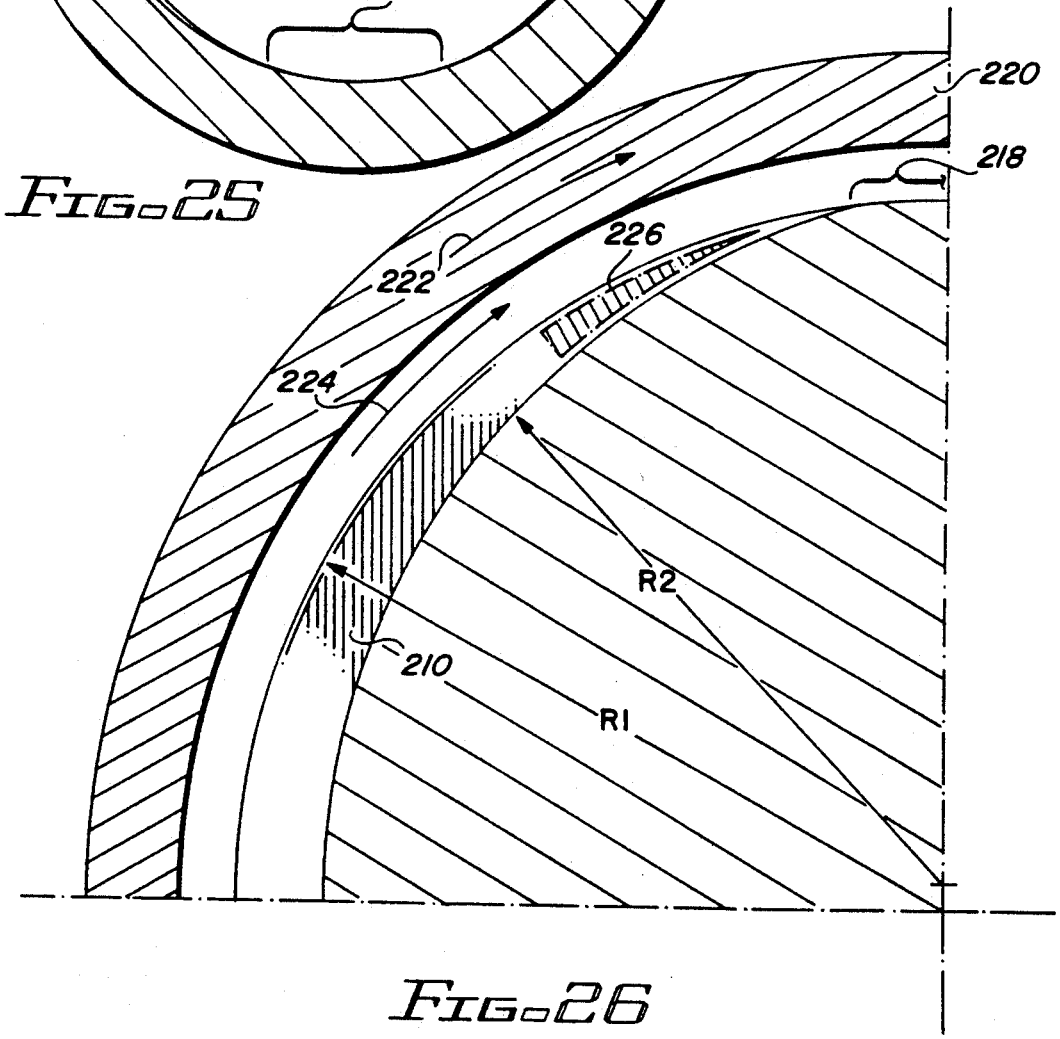
FIG. 26

METHOD FOR ELIMINATING WHIRL INSTABILITY IN A GAS SUPPORTED BEARING

This application is a divisional patent application of patent application Ser. No 752,017, filed Aug. 29, 1991, now U.S. Pat. No. 5,181,783, issued Jan. 26, 1993, which is a continuation-in-part application of Ser. No. 705,547, filed May 24, 1991 (now abandoned) which is a continuation patent application of Ser. No. 568,416, filed Jul. 16, 1990, now U.S. Pat. No. 5,019,738.

BACKGROUND OF THE INVENTION

1. Field of the Invention

This invention relates to gas supported bearings, and more particularly to high precision, high speed gas supported bearings.

2. Description of the Prior Art

FIGS. 1A and 1B depict a polygon mirror scanning system having a rotating polygon mirror 10 mechanically coupled to a rotating cylindrical shaft 12. The lower end of shaft 12 is rotatably coupled to the scanner housing 14 by ball bearing 16; the upper end of shaft 12 is coupled to housing 14 by ball bearing 18 Seals 20 minimize the circulation of liquid lubricant discharged from ball bearings 16 and 18 during high speed operations.

A permanent magnet 22 is rigidly coupled to shaft 12. When energized, motor field windings 24 interact with magnets 22 to rotate shaft 12 and polygon mirror 10.

Such prior art ball bearing supported motor driven loads respond to dimensional irregularities in the ball and race assemblies of the ball bearing and adverse interaction with the liquid lubricant can generate polygon mirror scanning errors of ten arc seconds or greater depending on the spacing between the two supporting bearing assemblies. Even when selected elements of the ball bearing scanning assembly are custom machined and custom fitted, scanning errors generally cannot be reduced below about five arc seconds. Lube redistribution can contribute to rotational period instability (velocity stability).

The unpreventable circulation of liquid lubricant discharged by the ball bearings enters the interior of housing 14, contaminates the reflective facets of polygon mirror 10, particularly along the leading edge of each facet, and thereby degrades the reflectivity of the mirror. Periodically, the individual facets of polygon mirror 10 must be cleaned to remove contaminating lubrication.

The prior art herringbone bearing assembly illustrated in FIG. 2 includes a cylindrical bore 26 and a shaft 28. Shaft 28 includes discrete herringbone patterns designated by reference numbers 30 and 32. Each herringbone pattern must be formed with the highest possible precision in the outer surface of shaft 38. As illustrated by the edge of the sectional view of shaft 28 as designated by reference number 34, approximately fifty percent of the shaft surface area within the herringbone pattern area is removed so that only approximately fifty percent of the remaining shaft surface can form a load supporting surface between the rotating shaft and the uninterrupted, cylindrical surface of the sleeve bore 26. This sharply limited load supporting surface area drastically reduces the load supporting forces or bearing stiffness generated between shaft 28 and sleeve 26. As a direct result, the closely spaced surfaces of shaft 28 and sleeve bore 26 do not lift off and become airborne until the grooves become pressurized. From 0 RPM to lift off velocity, these two surfaces operate as a contact bearing and mechanically rub against each other generating significant frictional forces and bearing surface wear.

The herringbone air bearing depicted in FIG. 2 relies upon the air pumping action generated by the interaction between the relatively rotating sleeve bore 26 and shaft 28. Such pumping forces generate a flow of pressurized air in the direction indicated by arrows 36 flowing upward through the bearing surface and are discharged from air discharge port 38. Once appropriate pressurization has been established by the rotating sleeve assembly, the sleeve bore 26 becomes airborne relative to the crowned top of the shaft 28. Until liftoff occurs, the top of shaft 28 rubs upon and can create surface wear at the interface between the top of shaft 28 and the base of air discharge port 38.

Another disadvantage of herringbone air bearings of the type depicted in FIG. 2 is that they must be operated in a vertical orientation. Deviation from the desired vertical alignment on the order of ten degrees of inclination can create rapid bearing surface wear and can result in failure of the herringbone bearing assembly.

The high level of mechanical precision required to create the herringbone pattern in the surface of bearing shaft 28 contributes to a high manufacturing cost.

SUMMARY OF THE INVENTION

It is therefore a primary object of the present invention to provide a high precision, gas supported bearing to rapidly and at low velocity build up high level bearing stiffness on the order of about 30,000 to 50,000 pounds per inch capable of operation over a wide speed range.

Another object of the present invention is to provide a high precision, gas supported bearing which produces lift off of the bearing sleeve relative to the bearing shaft at relatively low velocity.

Another object of the present invention is to provide a high precision, gas supported bearing which generates extremely high level bearing stiffness forces enabling operation of the bearing horizontally, vertically or in any intermediate attitude over a broad speed range.

Another object of the present invention is to provide a high precision, gas supported bearing which is capable of bidirectional operation.

Another object of the present invention is to provide a high precision, gas supported bearing capable of operation as a closed system to reduce problems caused by pumping debris into the bearing air gap.

Another object of the present invention is to provide a high precision, gas supported bearing which is capable of a minimum of 20,000 start/stop cycles.

Another object of the present invention is to provide a gas-supported bearing having a pneumatic load ramp formed in one of the bearing surfaces to apply an asymmetric load to the bearing at a location fixed relative to either bearing element to eliminate bearing whirl instability.

Another object of the present invention is to provide a gas supported bearing where the asymmetric load generated by a pneumatic load ramp increases with increasing bearing operating RPM to eliminate bearing whirl instability at various bearing operating RPM's.

Briefly stated, and in accord with one embodiment of the invention, a gas supported bearing includes a cylindrical bearing sleeve having a longitudinal axis and a cylindrical inner surface including a first bearing surface. The bearing also includes a cylindrical shaft positioned coaxially within the bearing sleeve. The bearing shaft includes a cylindrical outer surface having a second bearing surface. A relative rotational velocity is established between the bearing sleeve and the bearing shaft to generate a bearing supporting force along a bearing overlap zone where the first bearing surface overlaps the second bearing surface. The bearing overlap zone includes a defined length along the longitudinal axis. A pneumatic load ramp is formed in one of the bearing surfaces and includes a length along the longitudinal axis less than the length of the bearing overlap zone for applying an asymmetric load to the bearing at a location fixed relative to either the sleeve or the shaft to eliminate bearing whirl instability.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

FIG. 7 illustrates a cylindrical bearing shaft and sleeve where the geometry of the bearing gap changes as a result of taper error.

FIG. 8 illustrates a cylindrical bearing shaft and sleeve including bell mouth geometric errors at each end of the bearing assembly.

FIG. 9 illustrates the shaft and sleeve of a cylindrical bearing including a non-uniform air gap caused by a bowed shaft.

FIG. 10 illustrates a bearing assembly including a single shaft with two spaced apart sleeve elements where the gap between the shaft and sleeve for each bearing element is non-uniform.

FIG. 11 illustrates the shaft and sleeve of an air bearing illustrating geometric errors due to barrel effect.

FIG. 12 illustrates the shaft and sleeve of an air bearing illustrating geometric errors in the central portion of the sleeve bore.

FIG. 16A illustrates a random cross-hatched roughness pattern added to the surface of a metal bearing element.

FIG. 16B is partially cutaway sectional view of the bearing element illustrated in FIG. 16A, illustrating alternating lands and grooves.

FIG. 17A illustrates random, circumferential grooves in the surface of a metal bearing shaft.

FIG. 17B is a partially cutaway sectional view of the bearing element depicted in FIG. 17A, showing the relationship between bearing lands and grooves.

FIG. 18 illustrates an embodiment of the invention including a pair of counter-rotating sleeves on a non-rotating bearing shaft.

FIG. 19 illustrates a sectional view of an embodiment of the invention including spherical bearing surfaces.

FIG. 20 illustrates a sectional view of an embodiment of the invention including bearing surfaces formed as conic sections.

FIGS. 21A, B and C represent sectional views of self-pressurizing gas supported bearings configured as axial thrust control bearings.

FIG. 22 is a perspective view illustrating a pneumatic load ramp formed in the shaft of a self-pressurizing gas supported bearing.

FIG. 23 is a sectional view of the bearing shaft illustrated in FIG. 22, taken along section lines 23—23.

FIG. 24 is a partially cutaway perspective view of a stationary bearing sleeve incorporating a pneumatic load ramp of the present invention.

FIG. 25 is a sectional view of the bearing sleeve illustrated in FIG. 24, taken along section lines 25—25.

FIG. 26 is a ninety degree sectional view of a self-pressurizing gas supported bearing including the pneumatic load ramp of the present invention formed in the surface of a bearing shaft.

FIG. 27 shows the pneumatic load ramp of the present invention formed as three separate, spaced apart ramp elements.

DESCRIPTION OF THE PREFERRED EMBODIMENT

In order to better illustrate the advantages of the invention and its contributions to the art, a preferred hardware embodiment of the invention will now be described in some detail.

Figure 3:
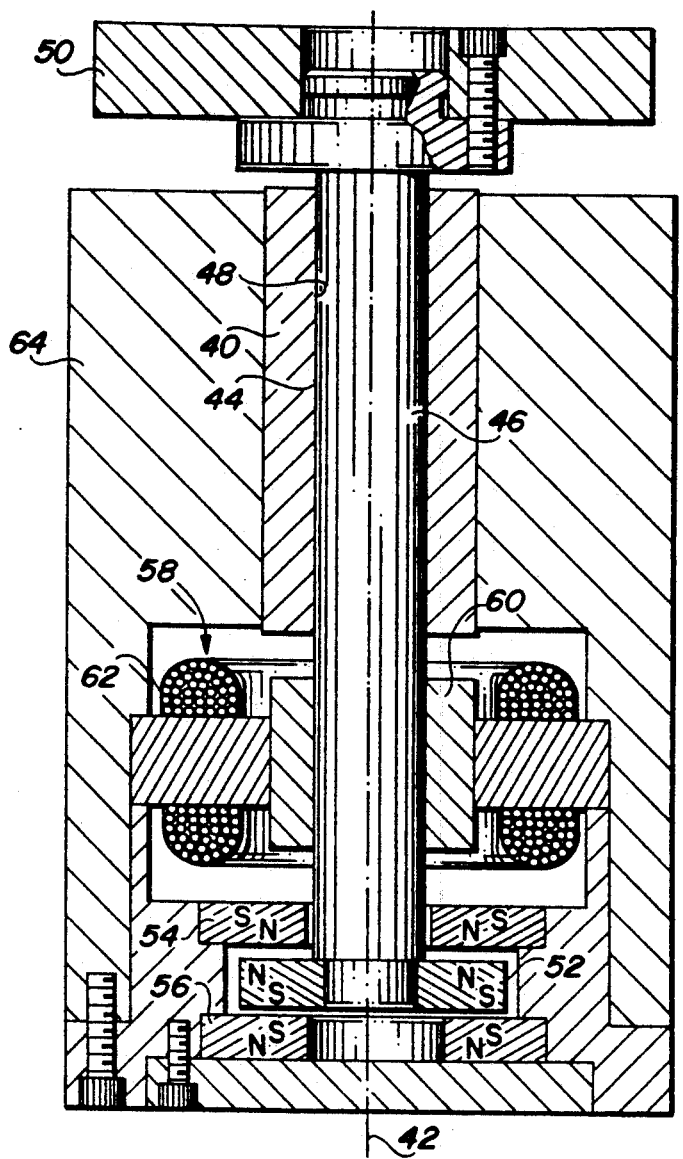
FIG. 3 represents a sectional view of a polygon mirror scanner including a self-pressurizing gas supported bearing of the present invention. In this embodiment of the invention, the cylindrical bearing shaft is rotated relative to a fixed cylindrical bearing sleeve.

Referring now to FIG. 3, a self-pressurized gas supported bearing includes a cylindrical bearing sleeve 40 having a longitudinal axis 42 and a cylindrical inner surface 44 which forms a first bearing surface.

A cylindrical bearing shaft 46 is positioned coaxially within bearing sleeve 40 and includes a cylindrical outer surface 48 which forms a second bearing surface. The upper end of shaft 46 is rigidly coupled to support a load such as a rotatable polygon scanning mirror 50.

The lower end of shaft 46 is coupled to an annular magnet assembly 52 which forms a part of an axial thrust bearing assembly which also includes a non-rotating annular magnets 54 and 56. As shown in FIG. 3, magnets 52, 54 and 56 are positioned with opposing poles to create magnetic repulsion forces both above and below rotating magnet 52. These essentially equal magnetic repulsion forces maintain an essentially fixed spacing on the order of about 0.030 inches between magnets 52 and 54 as well as between magnet 52 and magnet 56 to maintain an essentially fixed axially alignment for both shaft 56 and a load such as polygon mirror 50.

Although this particular axial thrust bearing design works well, numerous other types of axial thrust bearing assemblies well known to one of ordinary skill in the art could easily be substituted for the magnetic axial thrust assembly illustrated in FIG. 3.

Drive means in the form of an electric motor 58 is coupled to establish a desired relative rotational velocity between bearing sleeve 40 and bearing shaft 46. In FIG. 3, electric motor 58 includes a permanent magnet assembly 60 which is rigidly coupled to the outer surface of shaft 46 and a field winding 62 which is rigidly coupled to the non-rotating assembly housing 64.

Figure 4A:
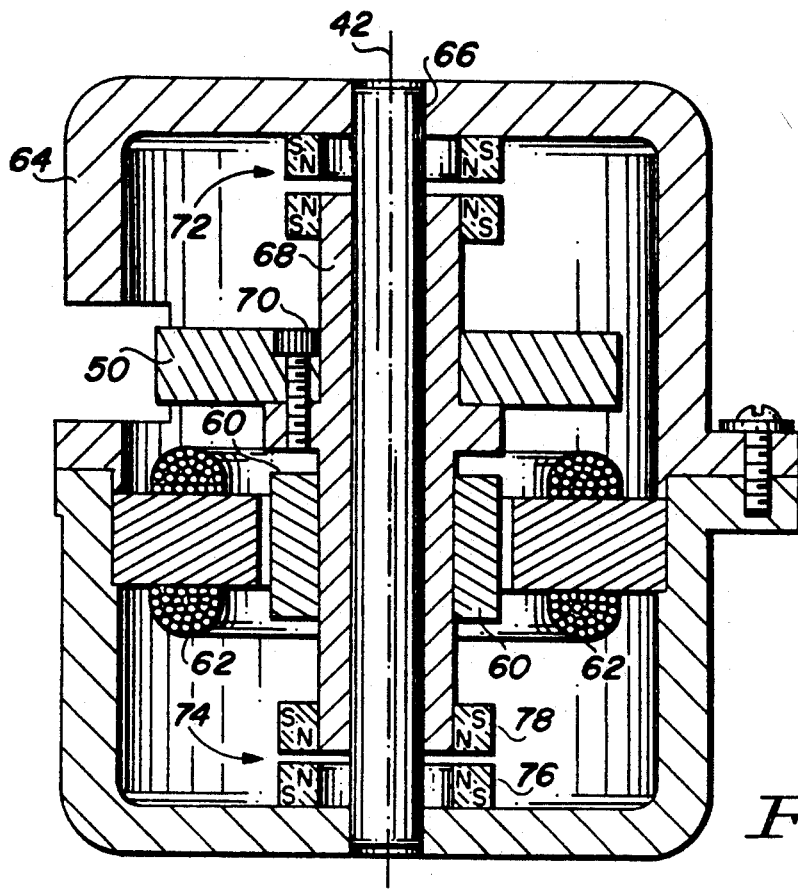
FIG. 4A represents a sectional view of a polygon mirror scanner including a self-pressurizing gas supported bearing of the present invention. In this embodiment of the invention, the cylindrical bearing sleeve rotates about a stationary cylindrical shaft.
Figure 4B:
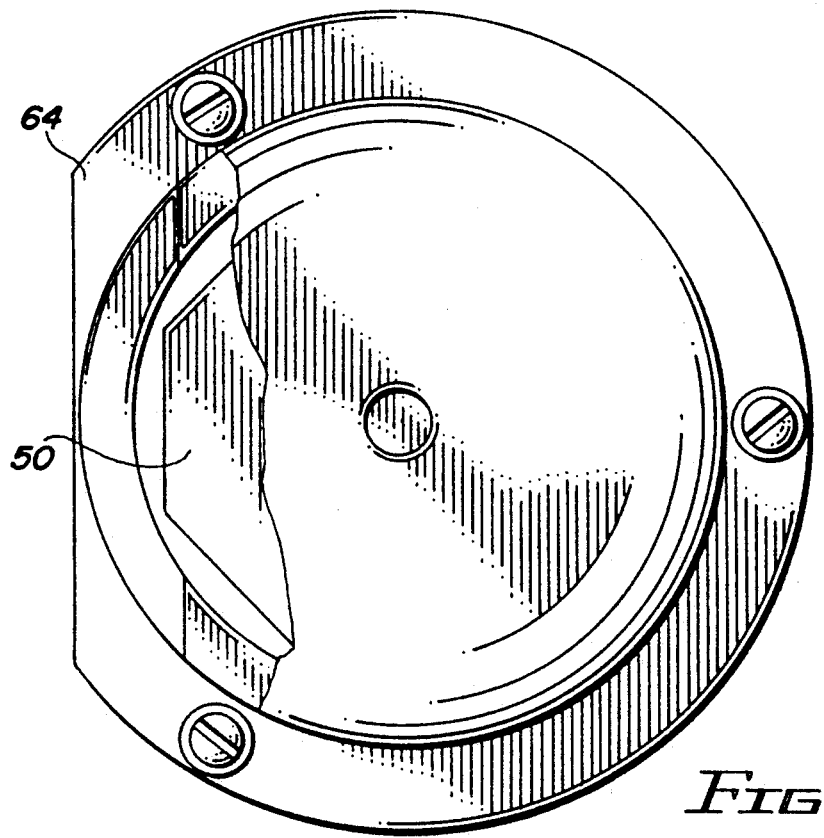
FIG. 4B is a partially cutaway top perspective view of the polygon mirror scanner depicted in FIG. 4A.

Referring now to FIGS. 4A and 4B, another embodiment of the self-pressurizing gas supported bearing of the present invention utilizing a fixed shaft and a rotating sleeve will now be described in detail.

FIG. 4A illustrates that bearing shaft 66 includes upper and lower ends which are rigidly coupled to cylindrical apertures in opposing ends of housing 64. Rotating bearing sleeve 68 is positioned coaxially outside of the bearing shaft. A load such as a rotating polygon mirror is mechanically secured to rotating sleeve 68 by a plurality of screws 70.

Axial thrust control magnet assemblies 72 and 74 are comparable to the assembly described in FIG. 3 are located at the upper and lower ends of rotating sleeve 68 to maintain essentially fixed axial or longitudinal position of sleeve 68 relative to shaft 66. Each magnet assembly includes a non-rotating magnet 76 and a rotating magnet assembly 78 which is rigidly coupled to each end of rotating sleeve 68.

Figure 5A:
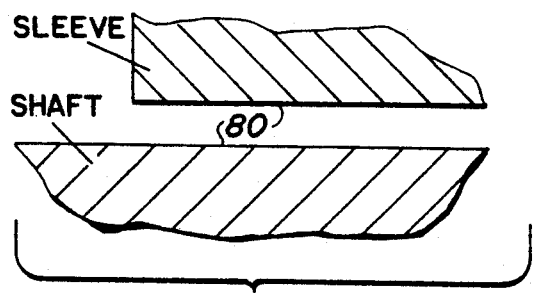
FIG. 5A represents a partially cutaway, illustrative sectional view showing the smooth bearing surfaces typical of prior art bearing structures.
Figure 5B:
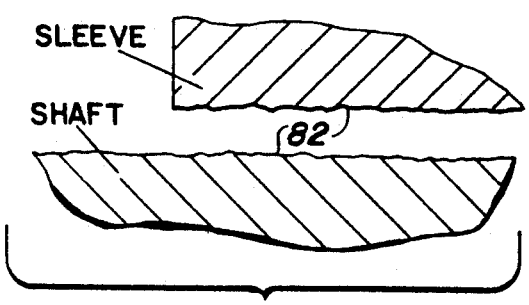
FIG. 5B represents a partially cutaway, illustrative sectional view showing the bearing surfaces of the present invention including a defined surface roughness.

Referring now to FIGS. 5A and 5B, prior art self-pressurizing gas supported bearings virtually universally use extremely smooth, highly polished bearing surfaces designated by reference number 80 in FIG. 5A. FIG. 5B illustrates the corresponding sleeve and shaft bearing surfaces of the self-pressurizing gas supported bearing of the present invention which necessarily include a quantified degree of roughness to the opposing bearing surfaces as illustrated by the bearing surfaces designated by reference number 82.

Figure 6A:
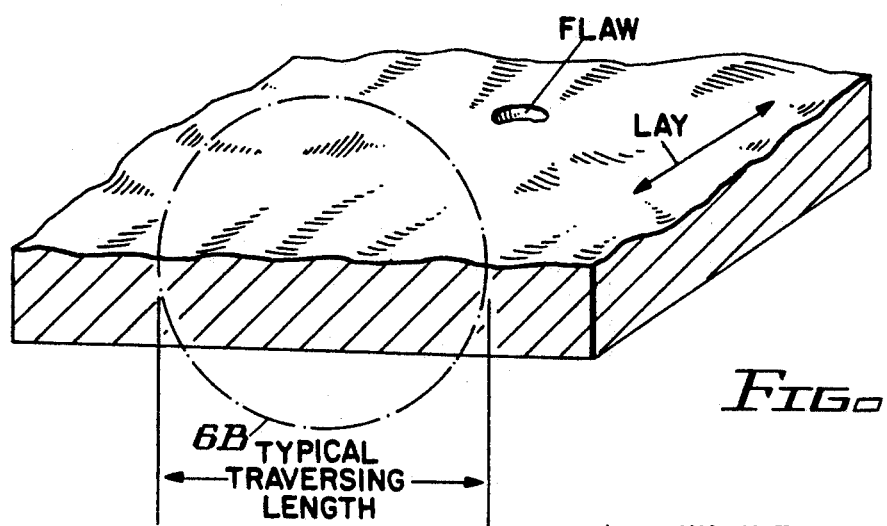
FIGS. 6A, 6B and 6C represent a series of views used to define mechanical engineering terms including Roughness Average $R_a$.
Figure 6B:
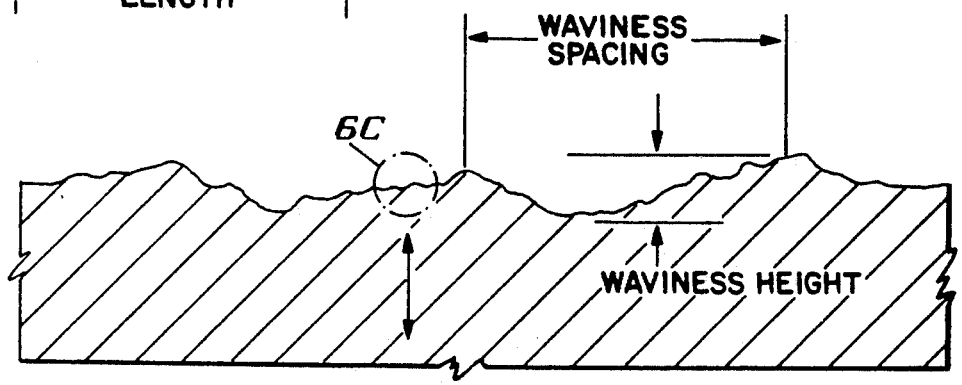
Figure 6C:
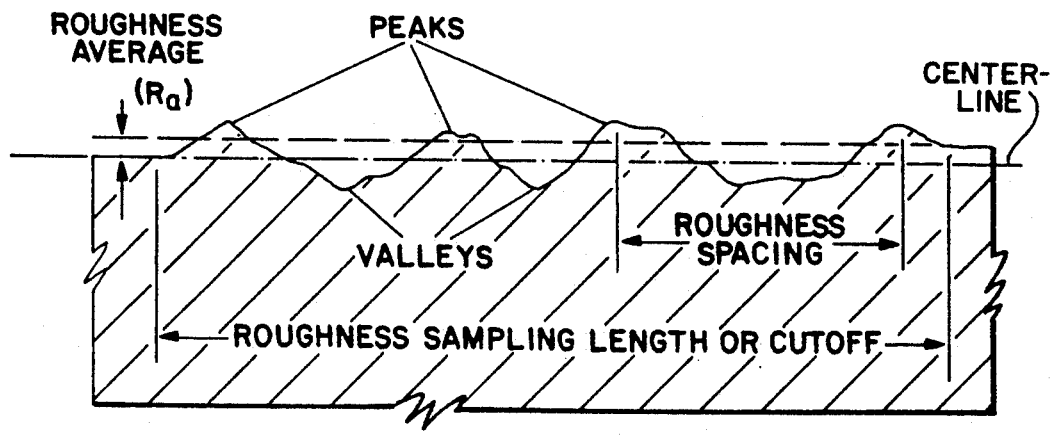

Referring now to FIGS. 6A, 6B and 6C, specific engineering terms relating to measurement of surface texture will now be reviewed to assist in defining the relevant roughness characteristics of the bearing surfaces 82 of the present invention.

Surface texture is generally recognized in mechanical engineering to include the following four characteristics:

1. Roughness—the finer irregularities in surface texture;
2. Waviness—the more widely spaced component of surface texture;
3. Lay—the direction of the predominant surface pattern; and
4. Flaws—the unexpected, unwanted surface texture.

FIG. 6A represents a perspective view of a segment of a surface intended to represent a reasonably linear surface. FIG. 6B represents an enlarged partial sectional view of the surface illustrated in FIG. 6A illustrating the surface texture characteristic of waviness FIG. 6C represents an enlarged sectional view taken from FIG. 6B illustrating the absolute variations of surface height including peaks and valleys Roughness Average designated by the symbol $R_a$ is graphically illustrated in FIG. 6C and is defined in mechanical engineering terms as meaning the arithmetic average of the absolute values or measured profile height deviations taken within the sampling length and measured from the graphical centerline. Roughness Average or $R_a$ is universally expressed in micrometers The $R_a$ parameters and limitations of the bearing surfaces of present invention will be expressed in terms of $R_a$. $R_a$ is further defined by MIL STD-10A dated 10/13/55 and is measured by readily available commercial test equipment such as Surftest Model 211 Surface Profilometer manufactured by Mitotoy of Japan.

The self-pressurizing gas supported bearing of the present invention can be implemented by using a variety of materials for the sleeve and shaft elements of the present invention as illustrated in FIGS. 3, 4 and 5B. Specially, the material combinations listed in Table 1 below have found to provide successful bearing surfaces for use in the present invention:

TABLE 1

| | SLEEVE | SHAFT |
|---|---|---|
| 1. | Steel | Ceramic |
| 2. | Hard anodized aluminum | Steel |
| 3. | Hard anodized aluminum | Ceramic |
| 4. | Hard anodized aluminum | Hard anodized aluminum |
| 5. | Ceramic | Ceramic |
| 6. | Ceramic | Steel |

To create a high precision, self-pressurizing gas supported bearing according to the present invention, four different parameters must be carefully controlled within defined limits. When such parameter control is properly implemented, a high precision bearing assembly can be created yielding non-repeatable errors significantly less than five arc seconds and typically equal to or better than one arc second at ambient temperature. higher temperatures on the order of 62° C. (140° F.), such non-repeatable errors can typically be controlled to a level equal to or less than about two to three arc seconds. Such accuracy is virtually an order of magnitude better than has been attained by ball bearing assemblies typically used in high precision scanning systems including photocopy machines, laser printers and related devices.

The first parameter which must be controlled to produce the high precision bearing of the present invention is referred to as the bearing geometry which includes the subcategory parameters of straightness, roundness and size uniformity. With cylindrical bearing configurations, the parameter of size uniformity includes both barrel and taper errors.

Referring now to FIGS. 7-12, the various types of geometry and geometric errors will now be briefly discussed although such terminology is well known to those of ordinary skill in the art.

FIG. 7 represents a relatively straight shaft 84 which is disposed within a sleeve 86 having a tapered bore. Such taper size uniformity variations create a non-uniform gap between shaft 84 and sleeve 86 which can, if excessive, degrade the performance of the bearing of the present invention.

FIG. 8 illustrates a straight shaft 84 positioned within sleeve 86 having a bore demonstrating bell mouth size uniformity variation at each end.

FIG. 9 illustrates a bowed shaft 84 within sleeve 86 having a highly accurate bore, creating a non-uniform air gap due to the lack of straightness of shaft 84.

FIG. 10 illustrates a dual bearing assembly defined by a single shaft 84 and a pair of sleeves 86. A non-uniform gap is created as a result of differential bore diameters between left hand sleeve 86 and right hand sleeve 86.

FIG. 11 illustrates a bearing assembly having a straight shaft with a sleeve 86 having a barrel configuration geometric error creating a non-uniform gap between the shaft and sleeve.

FIG. 12 illustrates a bearing assembly having a non-uniform gap produced by a barrel configuration error within the central portion of the bore of sleeve 86.

In implementing the present invention, the geometry of the shaft and sleeve elements of the present invention must be controlled within defined limits to create the desired, inventive function of the present invention. Specifically, as illustrated by FIG. 7, the geometry variations within the gap of the bearing assembly of the present invention must be controlled to limit the gap between the sleeve and the shaft to a total distance across the bearing of approximately equal to or greater than about 100 microinches up to less than about 350 microinches. As illustrated in FIG. 7, the first radial component of the overall gap dimension designated by reference number 88 is added to the second radial component of the gap dimension designated by reference number 90. The sum of the gap dimensional contributions designated by reference numbers 88 and 90 should fall within the range of between about two hundred microinches to about three hundred microinches to create a successful properly functioning gas bearing from the materials listed in Table 1.

For newly discovered materials not expressly listed in Table 1, the minimum gap dimension of one hundred microinches should apply, but the maximum gap dimension could conceivably increase above the typical three hundred microinch upper limit if such previously untested material can cause the two opposing bearing surfaces to lift off and become airborne at an velocity below the bearing operating velocity. One bearing element becomes airborne relative to the other bearing element when sufficient bearing stiffness is created between the relatively rotating bearing surfaces and the intervening gaseous layer moves the two surfaces out of mechanical contact with each other.

Figure 13:
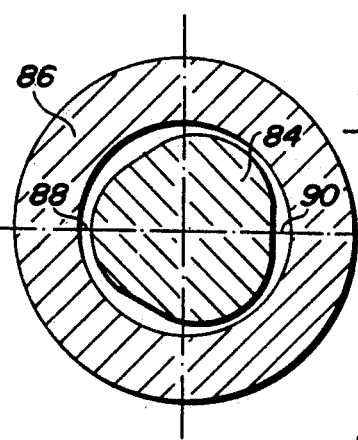
FIG. 13 is a sectional view of a cylindrical air bearing assembly including a shaft and sleeve illustrating the variation in gap dimension caused by geometric errors.

FIG. 13 represents a sectional view of shaft 84 and sleeve 86 further illustrating the diametrically spaced apart gap elements 88 and 90 which must be controlled to fall within the limits of the present invention.

Figure 14:
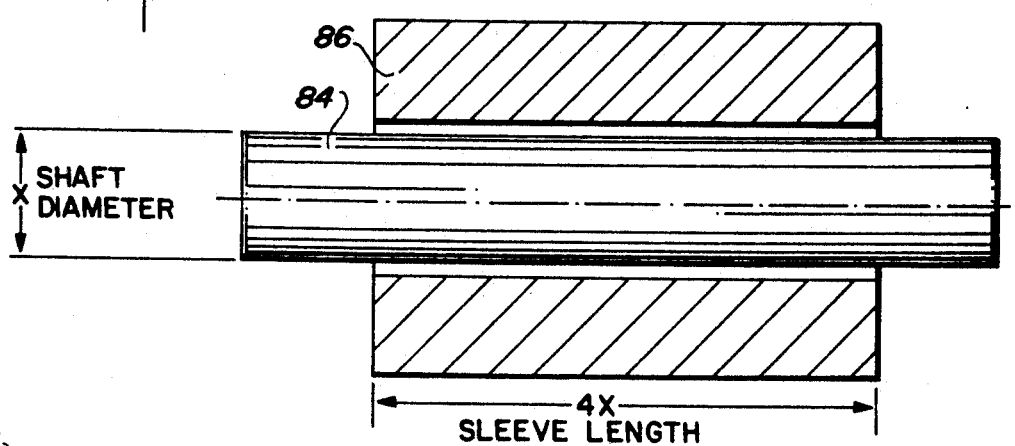
FIG. 14 defines the bearing aspect ratio as determined by the ratio of bearing shaft diameter to bearing sleeve length.

Referring now to FIG. 14, another geometry-related aspect of the present invention which must be controlled relates to the ratio of the shaft diameter designated by dimension "X" to sleeve length. The aspect ratio of sleeve length to shaft diameter for materials of the type listed in Table 1 must typically substantially equal three to one and most preferably equal about four to one or greater. Although there is no upper limit on the maximum aspect ratio of sleeve length to shaft ratio, as a practical matter, substantially longer sleeve lengths create serious difficulties relating to maintenance of the geometric gap limits of the present invention. As the length of the sleeve increases for a given shaft diameter, it becomes more difficult and much more expensive to maintain the required cylindricity necessary to implement the present invention.

The next parameter which must be controlled to implement the self-pressurizing gas supported bearing of the present invention is the surface texture or $R_a$ of the bearing surfaces. To achieve proper high accuracy, low wear characteristics of the present invention, the sum of the $R_a$ contributions from both the sleeve and the shaft must be approximately equal to or greater than about a minimum $R_a$ of eighteen (relatively smooth) and a maximum $R_a$ of 60 (relatively rough).

For the materials listed in Table 1, it has been found that although the sum of the $R_a$ contributions of the sleeve $R_a$ plus the shaft $R_a$ must approximately equal or exceed eighteen, it has also be found that if the $R_a$ of either the sleeve or the shaft falls below a minimum $R_a$ rating, the bearing of the present invention will not operate properly. For example, the minimum $R_a$ for the sleeve must be about equal to or greater than an $R_a$ of four while the minimum $R_a$ of the shaft must be approximately equal to or greater than about seven. In all cases, the $R_a$ total must either approximately equal or exceed eighteen. For an $R_a$ rating for the sleeve on the order of about four, the $R_a$ contribution of the shaft must be approximately equal to or greater than fourteen. Similarly, for a minimum $R_a$ shaft rating on the order of about seven, the sleeve $R_a$ must be about equal to or greater than about eleven.

When the $R_a$ of the sleeve plus the shaft falls below about an $R_a$ of eighteen, the bearing stiffness decreases and the well known phenomena of bearing coning increases, causing wobble of the load. In the rotating polygon mirror scanner embodiment illustrated in FIGS. 3 and 4, such coning errors translate into increased angular deviations of the output beam of the optical scanner. A similar phenomena occurs when the overall $R_a$ rating increases above about sixty or when the geometric errors exceed about one hundred microinches total.

The last parameter which must be controlled to create the self-pressurizing gas supported bearing of the present invention relates to the ratio of randomly distributed depressions in the bearing surface to the overall area of each bearing surface. As will be explained below, the bearing surface of both the sleeve and shaft must be specially selected and treated to include a predetermined minimum and maximum ratio of depressions capable of creating air reservoirs for the overall bearing surface area. In certain materials, these air reservoir-forming depressions take the form of grooves, cross hatching patterns or pockets.

Figure 15A:
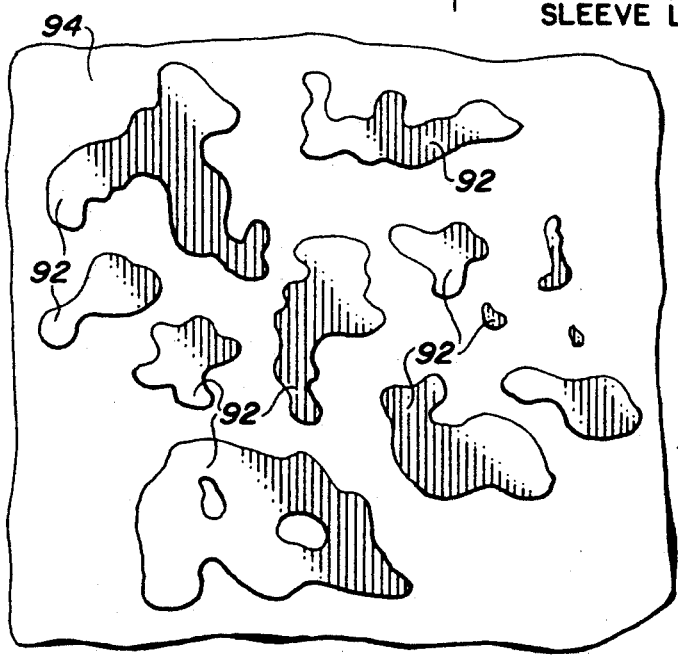
FIG. 15A illustrates the relative area of lands and grooves of a ceramic shaft.
Figure 15B:
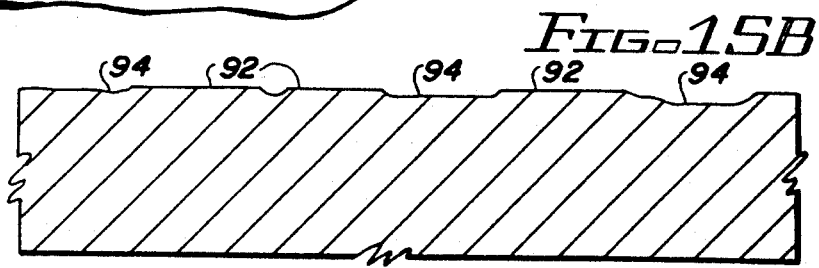
FIG. 15B is a partially cutaway sectional view illustrating the lands and grooves of a ceramic shaft.

Referring now to FIGS. 15A and 15B, the ratio of depressions or grooves to overall bearing surface for a ceramic shaft application will now be explained in detail.

The shaded sections of FIG. 15A represent the raised areas or lands 92 of an alumina ceramic shaft together with the intervening low spots or grooves located adjacent to each land. The grooves or depressed areas 94 create air reservoirs or pockets which are critical to the proper function of the bearing of the present invention.

For the bearing surface materials designated in Table 1, the overall area of the pockets or air reservoirs must be equal to or less than about fifty percent of the overall surface area of the bearing. For optimum performance levels, the area of the pockets or air reservoirs should fall generally within the range of about thirty to fifty percent of the overall bearing surface area such that the area of the lands 92 of the bearing representing the load bearing surface encompasses approximately fifty to seventy percent of the overall surface area.

For ceramic bearing materials of the type schematically illustrated in FIG. 15, microphotographs enlarged to approximately 300× permit visual inspection of the air pockets and lands of the ceramic material and facilitate computation of the ratio of the air pockets to the overall ceramic surface area.

Referring now to FIG. 16, FIG. 16A illustrates a partially cutaway perspective view of the surface of a steel or aluminum shaft or sleeve which has been treated by a honing process, or with abrasive technology or other methods to yield a random cross hatched pattern of lands 92 and grooves 94. In this embodiment of the invention, the grooves form the air pockets or air reservoirs and the ratio of the groove area to the overall bearing surface area should fall within the predetermined limits recited above.

Referring now to FIG. 17, FIG. 17A represents an enlarged, partially cutaway perspective view of a portion of a steel shaft processed by conventional gauge pin manufacturing techniques to include circumferential grooves 94 perpendicular to the axis of shaft rotation. FIG. 17B represents a partially cutaway sectional view of the lands 92 and grooves 94 illustrated in FIG. 17A. In this application, although the grooves are parallel to one another in a plane perpendicular to axis of rotation, the grooves are of random length and spacing. Such random groove distribution is an essential feature of the present invention.

Figure 1A:
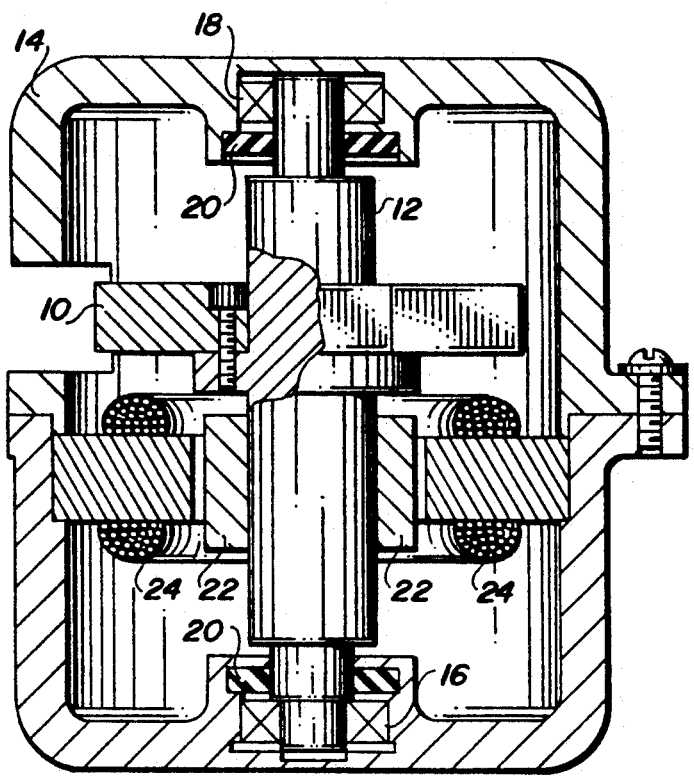
FIG. 1A is a sectional view of a prior art polygon mirror scanner including a rotating cylindrical shaft supported at each end by conventional ball bearings.
Figure 2:
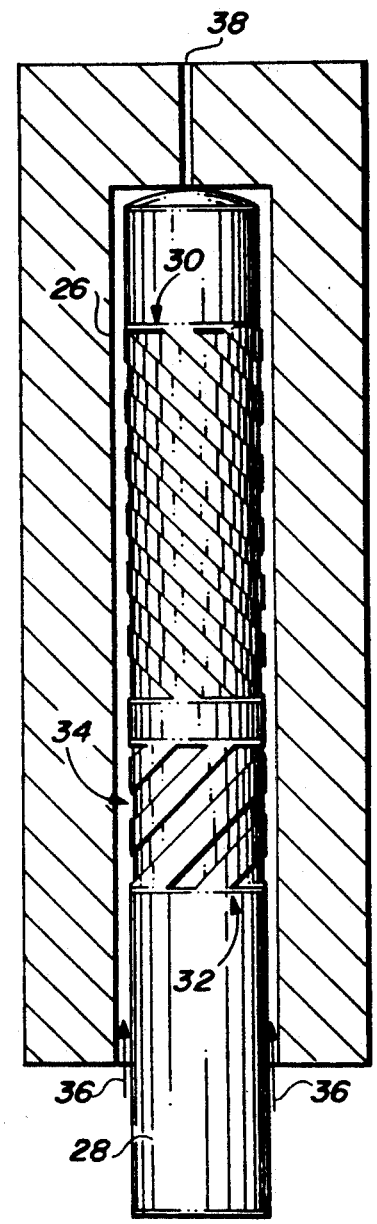
FIG. 2 represents a sectional view of a prior art herringbone gas supported bearing.
Figure 1B:
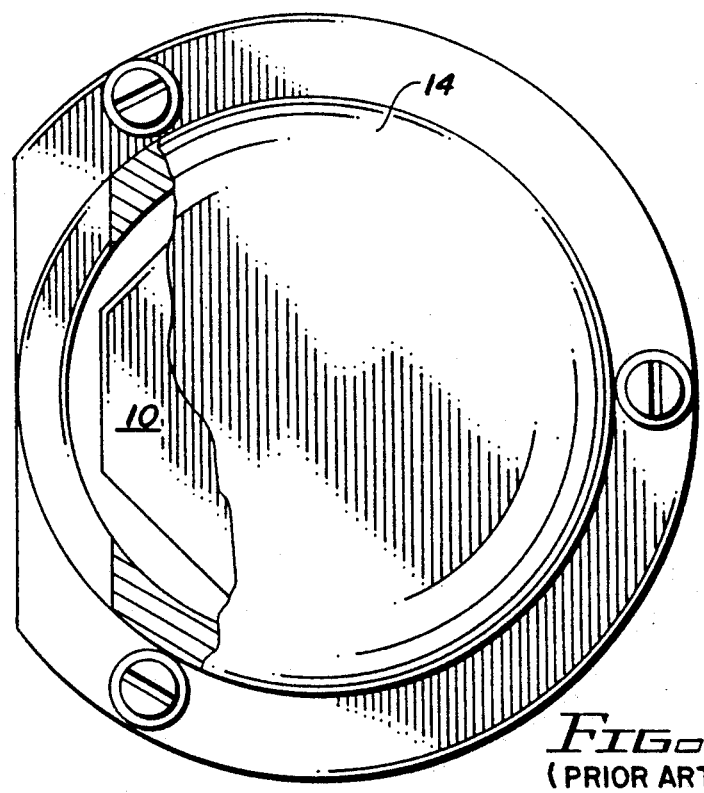
FIG. 1B represents a partially cutaway, perspective view of the scanner depicted in FIG. 1A.

In all of the embodiments described in FIGS. 15, 16 and 17, the grooves occur randomly and create a near-infinite number of air pockets or air reservoirs within the overall surface area of the bearing assembly. This configuration of the invention is sharply distinct from the highly patterned, repetitive and highly precise herringbone groove and land pattern described above in connection with FIG. 2.

To determine whether the necessary geometry limits, $R_a$ limits, air reservoir ratio limits and aspect ratio limits have been met, a bearing assembly can be tested by placing the bearing assembly in an operating application such as that illustrated in FIGS. 3 and 4 to determine whether non-repeatable errors have been reduced to an acceptable level for specific applications. Non-repeatable errors of less than one arc second are routinely observed. These measurements can be made electronically or optically.

Each of the controllable parameters of the present invention is inherently related to the other parameters. For example, lowering the $R_a$ rating of the bearing surfaces toward the eighteen $R_a$ lower limit of the invention lowers the bearing stiffness and requires implementation of more accurate geometry tolerances to the sleeve/shaft gap to reduce the gap dimension toward the one hundred microinch lower limit. For higher bearing surface $R_a$ ratings, much higher levels of bearing stiffness are created enabling the use of looser bearing gap geometric tolerances toward the upper limit of about three hundred. Similarly, as the ratio of air reservoir or pocket area to overall bearing surface area diminishes toward the lower limit, increased $R_a$ ratings toward the upper limit can be used to compensate.

The numerous interrelationships between bearing gap geometry, $R_a$ rating, air reservoir ratio and aspect ratio clearly demonstrate the empirical relationship between each of these parameters. Meeting the above parameters are necessary to make the present invention work.

A process that is unnecessary to make the present invention work but may be helpful to extend the start/stop cycle life is the application of a dry lube which reduces the contact friction which occurs at the start and end of operation when the bearing is not airborne.

The random texture and closed flow design provides for low velocity pressurization and depressurization during the operating cycle.

For each of the different type of bearing surface components identified in Table 1, the method of implementing the required surface treatment will now be described in detail.

For ceramic sleeves or shafts, ceramics having an alumina content of from about 94% to about 99.8% should be provided. Such materials are available from the Ceram Division of the Coors Ceramic Company of El Cahon, Calif. or from the Mindrum Precision Products Company of Rancho Cucamonga, Calif. Either of these organizations can provide ceramic surface finishes over a broad $R_a$ range and can readily provide appropriate ceramic surface $R_a$ ratings to specification.

The geometry of a ceramic shaft or sleeve must be controlled to a cylindricity rating of twenty-five millionths of an inch. This specification is defined by creating two concentric cylinders where the diameters of the inner cylinder is fifty millionths of an inch less than the diameters of the outer cylinder and where the gap between the outer surface of the inner cylinder and the inner surface of the outer cylinder is equal to twenty-five millionths of an inch radially. All parts of the surface of a ceramic element meeting this cylindricity specification must fall within the gap between the two concentric cylinders. Ceramic bearing elements meeting this cylindricity specification also meet all of the relevant geometric parameters of straightness, roundness and size uniformity.

The ratio of air pockets to overall bearing surface area can be inspected by microphotographs with an enlargement of between about 300× to 600×. Optimum performance is achieved when this ratio equals approximately forty to fifty percent.

When all of the above-stated parameters have been achieved, no further treatment of ceramic bearing surfaces is necessary.

When either the bearing sleeve or shaft is fabricated from steel, four hundred and forty stainless steel or its equivalent has found to function acceptably. A cylindricity specification identical to that described above in connection with ceramic materials adequately controls the bearing surface geometry.

One acceptable method of manufacturing a steel sleeve capable of functioning as a bearing element of the present invention involves implementation of the following sequence of steps:

1. Machining the sleeve bore to a slightly undersized diameter;
2. Initially honing the sleeve bore to increase the sleeve diameter to the desired diameter and to achieve the desired surface geometry; and
3. Completing a final honing step to achieve the desired $R_a$ figure within the limits of the invention.

To prepare a 440-steel shaft for use in a bearing of the present invention, the following procedures may be implemented to achieve that purpose:

1. Manufacturing the steel shaft to desired geometry specifications by conventional gauge pin manufacturing techniques including roll lapping the surface of the steel shaft to an $R_a$ of between about two to four; and
2. Rotating the steel shaft on a lathe to roughen the surface of the shaft with 180 grit wet or dry sandpaper where the sandpaper contacts the steel shaft in a first pass with a first lateral direction of movement and in a second pass with a second lateral direction of movement to get the desired random cross hatched pattern of the type illustrated in FIG. 16A and increase the $R_a$ from two to four to approximately eighteen to thirty.

Although the surface of the steel shaft can be finished and polished down to a much lower an $R_a$ rating, the foregoing process indicates that abrasive techniques including application of wet or dry sandpaper are implemented to form a cross hatched pattern of grooves and lands to achieve an $R_a$ rating of from eighteen to thirty, a far higher $R_a$ rating than that which could have been achieved were smoothness the desired object of the invention.

The following steps may be carried out to treat an aluminum shaft to successfully function in a bearing of the present invention:
1. Honing the aluminum shaft to achieve a slightly undersized geometric dimension or lathe cutting or machining the aluminum shaft to the desired geometry;
2. Hard anodizing the surface of the shaft;
3. Finish honing the anodized shaft to achieve finished geometric dimension; and
4. Honing the anodized aluminum surface with approximately two strokes of a Sunnen honing stone to achieve desired surface texture as described below.

To provide appropriate surface treatment for an aluminum sleeve, the following steps can be implemented:
1. Machining the aluminum bore to a slightly undersized dimension;
2. Hard anodizing the aluminum bore which results in a dimensional build up of the bore;
3. Honing the anodized aluminum bore to the desired geometry; and
4. Honing the anodized aluminum bore with approximately two strokes of a Sunnen honing stone to achieve the desired surface texture (Sunnen Products Company, St. Louis, Mo.: For Step 3 honing, use Sunnen Stone No. K12-A55 (aluminum oxide, 220 grit, hardness of 5). For Step 4 honing, use Sunnen Stone No. K12-A47 (aluminum oxide, 150 grit, hardness of 7).

Although a limited number of material treatment procedures have been described above to achieve operative surface texture, any one or more of the essentially equivalent surface finishing techniques listed below could be implemented using existing techniques to achieve the required $R_a$ rating and air reservoir ratios:
1. Honing;
2. Etching;
3. Centerless grinding;
4. Ion implanting;
5. Shot peening;
6. Two-step machining/etching;
7. Burnishing;
8. EDM (electric discharge machine);
9. Plasma coating; and
10. Other equivalent techniques.

In one embodiment of the invention, the following dimensions were found to yield highly acceptable bearing performance;
1. shaft diameter: 0.4060 inches
2. sleeve bore diameter: 0.40625 inches
3. bearing clearance (radial): 0.000125 inches nominal.

For the various material combinations listed in Table 1, various advantages and disadvantages have been observed or noted. The most reliable combination represents implementation of a steel sleeve on a ceramic shaft. The advantages of this combination are as follows:
1. Closely matched thermal coefficients of expansion;
2. A sleeve made from hardened 440C stainless steel can also function as the rotor of a hysteresis synchronous motor, avoiding the requirement for a permanent magnet rotor; and
3. High resistance to corrosion.

As to the combination of a hard anodized aluminum sleeve on a hardened steel shaft, the following advantages and disadvantages have been observed:
1. Steel shafts can be fabricated by well known and easily implemented gauge pin manufacturing techniques at reasonable cost to yield a surface textured shaft with excellent geometry;
2. The aluminum sleeve is easily machined and can be hard anodized to yield a hard, readily honed bearing surface; and
3. The dissimilar coefficients of thermal expansion of aluminum and steel limit the operating temperature range of the bearing.

The following advantages and disadvantages have been noted from observation of bearings fabricated using hard anodized aluminum for both the sleeve and shaft:
1. The identical thermal coefficient of expansion enables operation over wide temperature ranges; and
2. Aluminum materials easily machined.

As to the use of a ceramic sleeve and shaft, the following advantages and disadvantages have been noted:
1. Identical thermal coefficient of expansion permits operation over wide temperature ranges; and
2. The material is a highly stable material.

Dry lubricant can by applied to one or both of the bearing surfaces to minimize frictional wear from commencement of bearing rotation until bearing liftoff occurs at approximately seventy-five to two hundred and twenty-five surface feet per minute. Between 0 velocity and liftoff velocity during both start-up and shut down, the bearing surfaces contact each other and function as a contact bearing. Dry lubricant functions exclusively during this transition velocity region and reduces frictional wear of the two contacting bearing surfaces. Dry lubricant is unnecessary to cause the present invention to function.

To limit contact phase operation bearing surface wear, the sleeve bore and shaft may be treated with tungsten disulfide or a boron nitrite based dry lubricant.

For a bearing including a ceramic sleeve and a ceramic shaft, dry lubricant is typically not used. For the steel sleeve/ceramic shaft embodiments, dry lubricant may be applied to the sleeve bore. For aluminum/steel bearing surfaces, lubricant may be applied to both surfaces.

The present invention can be implemented in various other embodiments in addition to the specific embodiments described above. For example, FIG. 18 illustrates the use of two counter-rotating sleeves on a common fixed shaft. A series of magnetic axial thrust bearings are coupled as shown to maintain the requisite axial alignment of the various bearing elements.

Referring now to FIG. 19, a spherical rotating bearing element 100 is rigidly coupled to motor shaft 102 and interfaces with a matching, stationary spherical bearing surface 104. In the FIG. 19 embodiment of the invention, an adjusting mechanism must be provided to adjust the relative position of rotating bearing surfaces 100 with respect to longitudinal axis 106 to provide an appropriate gap dimension as explained above. Such adjustment could be accomplished by providing an adjustable hub, adjustment screws or even by appropriately selected shims.

Referring now to FIG. 20, the bearing assemblies of the present invention are fabricated as conic sections including a rotating conic bearing surface 108 and a stationary conic bearing surface 110. Bearing surface 108 is rigidly coupled to a rotating shaft 112. As was the case with the spheric section bearing assembly illustrated in FIG. 19, adjustment of at least one of the two bearing surfaces 108 with respect to longitudinal axis 112 must be provided by appropriate adjusting means such as shims, screws or adjustable hubs.

In both the FIG. 19 and 20 embodiments of the invention, the rotating and stationary bearing surfaces must be carefully matched as, for example, by applying a fine grit abrasive material between the rotating surfaces to wear in and match the adjacent bearing surfaces. It may also be possible by appropriate, highly accurate machining techniques to avoid such an abrasive wearing step. Upon completion of such abrasive matching procedures, the resulting bearing surface texture must be evaluated to determine whether further bearing surface treatment is required to provide the appropriate $R_a$ surface roughness required for appropriate operation of the present invention.

Referring now to FIG. 21A, the bearing assemblies of the present invention are fabricated as annular disc sections including rotating discs 114 with bearing surface 116 and stationary discs 118 with bearing surfaces 120. Rotating discs 114 are rigidly coupled to a rotating sleeve 122. A cylindrical bearing shaft 124 is positioned coaxially within bearing sleeve 122 having ends which are rigidly coupled together with disc 118 to housing 126.

The bearing illustrated in FIG. 21A functions as an axial thrust control bearing. The discs are matched to provide an appropriate gap dimension and surface $R_a$ as explained above.

A bearing of this configuration with thrust bearings on each end as shown in FIG. 21A can operate horizontally or vertically. A bearing with thrust surfaces on one end only can be operated in a vertical attitude with the thrust surfaces supporting a load.

FIG. 21B illustrates a bearing that includes discs 128 with thrust surfaces 130 rigidly coupled to rotating shaft 132. Disc 134 with thrust surfaces 136 is rigidly coupled along with bearing sleeve 138 to the housing 140.

FIG. 21C illustrates a bearing that includes disc 142 with thrust surfaces 144 rigidly coupled to rotating sleeve 146. Discs 148 are rigidly coupled along with bearing shaft 150 to the housing 152.

Although only specific embodiments of these axial thrust control bearings are illustrated in FIGS. 21A, B and C, the application of gas supported air bearings as axial thrust control bearing assemblies could be modified in numerous ways readily understandable to one of ordinary skill in the art based upon principals illustrated in FIG. 21.

Numerous benefits are achieved by implementation of the present invention. The unique and interrelated combination of bearing geometry, $R_a$ roughness, ratio of air reservoirs to bearing surface area and aspect ratio create an extraordinarily high bearing stiffness on the order of 30,000 to 50,000 pounds per inch.

The unique structure of the present invention also results in a rapid stiffness build up as operating velocity increases from start up and results in extremely low speed lift off of one bearing surface relative to the other. The present invention experiences lift off at from approximately seventy-five to two hundred and twenty-five surface feet per minute. One prior art herringbone bearing assembly does not attain liftoff until approximately six hundred surface feet per minute.

The bearing of the present invention can also operate at extremely high RPM's. A prototype of the present invention was successfully tested at 40,000 RPM, the maximum RPM of the prototype drive motor. Prior art herringbone bearings are typically limited to maximum RPM operation at on the order of about 30,000 RPM.

The extraordinarily high bearing stiffness ratings achieved by the present invention (on the order of 30,000 to 50,000 pounds per inch) permits operation of the bearing in any attitude including horizontal, vertical or inclined. The bearing stiffness ratings of some prior art herringbone systems are insufficient, require operation in a vertical attitude and cannot successfully operate for any significant amount of time with inclinations of even ten degrees away from vertical.

The bearing of the present invention can also be operated with either a clockwise or counterclockwise rotation direction. The prior art herringbone bearings are unidirectional in view of the unique herringbone groove pattern and the requirement to pump air in a single direction to pressurize the bearing.

The present invention operates as a closed system without a requirement for an external air supply. Herringbone bearing assemblies require a source of air which is pumped through the bearing. Unless operated in a debris free environment, herringbone air bearings are nearly always contaminated by airborne debris, causing catastrophic bearing failure.

The bearing of the present invention can operate at high altitude and has been tested at altitudes up to 20,000 feet without significant performance degradation.

The unique structure of the bearing of the present invention results in extremely low bearing surface wear. A prototype of the present invention has been tested for more than 40,000 start/stop cycles and although extremely high resolution measuring equipment was used to inspect for wear, no measurable wear could be discerned. The operating lifetime of this bearing is therefore predicted to be well in excess of 20,000 start/stop cycles. Some prior art herringbone bearing assemblies are typically specified as having a lifetime of only 10,000 start/stop cycles. A prototype of the present invention has been operating continuously in excess of 22,000 hours to date with no evidence of wear. The operating lifetime of prior art ball bearing assemblies is typically on the order of about 2000 hours at speeds above 20,000 RPM.

The unique structure of the present invention provides a full length bearing assembly across the entire opposing surface of the bearing sleeve and the bearing shaft to provide very large bearing support surface areas providing excellent shock resistance to shipping and handling damage. Prior art herringbone bearing assemblies rely on relatively short, small area bearing surfaces.

If the materials used in the bearing sleeve and shaft are properly matched with respect to thermal coefficients of expansion as can readily be done, extremely wide temperature operating ranges can be readily achieved.

Because the bearing assembly of the present invention experiences extremely low frictional torque, a negligible heat rise is achieved, typically on the order of less than about 5° F. at an operating RPM of about 22,000 RPM. This limited heat rise is due primarily to motor heating.

The utilization of dry lubricant (when lubricant is used with the bearing of the present invention) instead of a wet lubricant as used in prior art ball bearing assemblies completely eliminates the lubricant contamination problems experienced by prior art ball bearing units. For optical applications, lubricant contamination of the optical surfaces is thus completely avoided by use of the present invention.

The random redistribution of the wet lubricant used in prior art ball bearings causes random variations in the ball bearing drag forces. These random redistributions contribute to rotational velocity error in the rotating member. The elimination of the wet lubricant of the present invention gas bearing typically improves the velocity stability by a factor of 2 over prior art ball bearings.

Because the present invention utilizes a near-infinite number or random lands and grooves and inexpensive manufacturing techniques to achieve the required bearing surface configuration, the bearing of the present invention can be manufactured at extremely low cost. The requirement of prior art herringbone bearings for fixed, highly precise geometry patterns result in close manufacturing tolerances and high manufacturing costs.

It will be apparent to those skilled in the art that the disclosed self-pressurizing gas supported bearing may be modified in numerous other ways and may assume many other embodiments in addition to the preferred forms specifically set out and described above.

During advanced research and development directed toward commercial application and mass production of the self-pressurizing gas supported bearing with surface roughness finish as described above, it became apparent that under specific operating conditions involving high bearing operating RPM (25,000 RPM and higher) and low load ($\frac{1}{4}$ pound) that although the invention exhibited superior performance in many ways in comparison to related prior art bearings, the bearing of the present invention frequently encountered an instability phenomenon commonly referred to as half-speed whirl instability. Such whirl instability manifests itself as uncontrollable radial movement of the rotating cylindrical bearing element relative to the stationary cylindrical bearing element, causing severe frictional erosion of the bearing surfaces and rapid bearing failure. Under lower operating RPM conditions or higher load conditions, the whirl instability problem described above did not arise.

Referring now to FIGS. 22–26, an improvement for eliminating this whirl instability problem in either surface roughness bearings or conventional smooth bearings, will now be described in detail.

Referring initially to the embodiment of the invention illustrated in FIGS. 22, 23 and 26, a pneumatic load ramp 210 is formed as an eccentric annulus in the exterior surface of the midsection of a first cylindrical bearing element in the form of shaft 212. In this particular embodiment of the invention, a ceramic shaft 212 includes an overlap length 208 of 2.68 inches while pneumatic load ramp 210 includes a length of 1.06 inches. The term "overlap length" identifies the effective bearing area where the bearing surfaces of the shaft and sleeve overlap. This particular configuration of the invention therefore divides bearing shaft 212 into undisturbed end surfaces 214 and 216 each having a length of 0.81 inches with each representing thirty percent of the overlap length of shaft 212. In this embodiment, shaft 212 represents the rotationally fixed or stationary bearing element. In an alternative embodiment of the invention, shaft 212 could be dynamically balanced in a conventional manner and configured to serve as the rotating bearing element.

Pneumatic load ramp 210 typically includes a circumferential section designated by reference number 218 where the surface of bearing shaft 212 is not relieved or ground away. In one specific embodiment of the invention, the width of unrelieved circumferential section 218 is equal to 0.30±0.03 inches measured around the circumference of shaft 212. In that same embodiment of the invention, the radius $R_1$ of shaft 212 equals 0.2030±0.0005 inches while the radius $R_2$ of the eccentric annulus which forms pneumatic load ramp 210 equals 0.2016±0.0005 inches. These differential radial dimensions typically yield a maximum relief of about 0.003 to 0.004 inches between the circumference of pneumatic load ramp 210 and the circumference of bearing shaft 212.

As illustrated in FIG. 26, the bearing of the present invention may be formed by positioning stationary shaft 212 coaxially within rotating sleeve 220 where the clockwise direction of rotation of sleeve 220 is designated by reference number 222. The combined effect of the relative rotation between rotating sleeve 220 and stationary shaft 212 and the geometric discontinuity created between the full radius section $R_1$ and the reduced radius section $R_2$ pneumatic load ramp 210 in combination with the internal airflow path designated by reference number 224 creates an interaction in the form of an increased pressure air wedge 226. Air wedge 226 maintains a fixed angular position immediately counterclockwise from unrelieved circumferential section 218 of shaft 212. Air wedge 226 thereby creates a force or load across a relatively small included angle and along a less than full length section of the bearing surface. The angular position of the air wedge force remains fixed relative to stationary bearing shaft 212.

This embodiment of the pneumatic load ramp of the present invention thereby applies an asymmetric load to the bearing at a location fixed relative to the stationary bearing shaft and provides a fixed load point for the bearing to react to. Since this load point does not and cannot move relative to the stationary bearing shaft, the undesirable phenomenon of bearing whirl instability cannot arise as long as the magnitude of the asymmetric load generated by pneumatic load ramp 210 is sufficient to resist the radially directed force vectors which otherwise induce bearing whirl instability.

Because the force generated by air wedge 226 increases with increasing bearing operating RPM and because the tendency of the bearing to create whirl instability forces increases in a corresponding manner with increasing bearing RPM, the force produced by air wedge 226, if of a sufficient magnitude at a given bearing operating RPM, will typically be adequate to overcome bearing whirl instability forces regardless of bearing operating RPM.

The magnitude of the radial force created by air wedge 226 is controlled by a variety of bearing geometry factors. The longitudinally oriented length of pneumatic load ramp 218 is designated by reference number 228. The magnitude of the air wedge 226 force varies directly with the length 228 of pneumatic load ramp 210. If the length of pneumatic load ramp 210 is reduced below a critical minimum length, the bearing whirl instability forces will overcome the counterbalancing force generated by air wedge 226 and the whirl instability problem will reappear. The length 228 of pneumatic load ramp must therefore be set at a minimum length slightly in excess of this critical minimum length to ensure satisfactory bearing operation.

As the length 228 of pneumatic load ramp 210 increases, the resulting length of bearing end surfaces 214 and 216 decreases. As a critical maximum pneumatic load ramp length is exceeded, the total length of bearing end surfaces 214 and 216 decreases below a critical minimum length where air wedge 226 generates an asymmetric load in excess of the load which can be supported by bearing end surfaces 214 and 216. This excessive pneumatic load ramp force asymmetrically displaces the rotating bearing element relative to the stationary bearing element and results in unsatisfactory bearing performance. Accordingly, for satisfactory bearing operation, this critical maximum length of the pneumatic load ramp should not be exceeded.

Although the precise length 228 of pneumatic load ramp 210 is not particularly critical, that length must be selected to lie between the minimum critical length and the maximum critical length described above. A highly satisfactory length for pneumatic load ramp 210 has been found in the specific application described above to equal approximately one third of the overall length of the bearing shaft. The length of pneumatic load ramp 210 will typically occupy from between about 10% to about 50% of the overlap bearing length 208 defined by the sum of the lengths of bearing end surfaces 214 and 216 and the length 228 of pneumatic load ramp 210. Selection of a specific length 228 for pneumatic load ramp 210 in view of the teachings recited above regarding critical minimum and maximum lengths would be readily apparent to one of ordinary skill in the bearing art.

Other factors relating to the geometry of the pneumatic load ramp of the present invention will also affect the magnitude of the force generated by air wedge 226. For example, an appropriate length for the essentially unrelieved circumferential section 218 must be selected as well as the differential distance between radius $R_1$ of shaft 212 and radius $R_2$ of the pneumatic load ramp. Selection of these particular geometric parameters for specific bearing applications could be readily determined by one of ordinary skill in the bearing art based on the teachings recited above.

Pneumatic load ramp 210 can readily be formed in the selected air bearing element by using conventional machine tools to grind the desired geometric configuration into the surface of the selected rotating or stationary bearing element. The geometric tolerances for the exterior surface dimensions of the pneumatic load ramp are not particularly critical and can be empirically determined.

In an alternative embodiment of the invention illustrated in FIGS. 24 and 25, the pneumatic load ramp of the present invention is formed as an eccentric annulus designated by reference number 230 recessed into the cylindrical interior surface of bearing sleeve 232. Determination of the pneumatic load ramp length and other geometric configurations such as the circumferential length of the unrelieved circumferential section 234 and radial distances $R_1$ and $R_2$ are determined as stated above in connection with formation of the pneumatic load ramp in bearing shaft 212. If the pneumatic load ramp 210 is formed in a bearing sleeve 232 which serves as the rotating bearing element, the rotating sleeve/pneumatic load ramp bearing element should be dynamically balanced using conventional techniques.

As illustrated in the drawings, the pneumatic load ramp of the present invention may be formed as either a reduced diameter eccentric section in the bearing shaft or as an increased diameter eccentric section in the bearing sleeve.

The pneumatic load ramp of the present invention can be incorporated in self-pressurizing gas supported bearings including first and second $R_a$ roughness profiles falling within the range of from about eighteen to about sixty as taught above. Alternatively, the pneumatic load ramp of the present invention can be incorporated in conventional smooth or polished air bearing surfaces having configurations and highly polished surface finish tolerances well known to those of ordinary skill in the art.

The inventive method of applying an asymmetric load to the bearing at a location fixed relative to a selected stationary or rotating bearing surface can be implemented with configurations different from the pneumatic load ramps illustrated in FIGS. 22-26 For example, an asymmetric load in compliance with the teachings of the present invention could be imparted to the bearing by positioning a single pole of a permanent magnet adjacent to a bearing having a rotating ferromagnetic steel sleeve and a stationary, non-ferromagnetic ceramic shaft. In another embodiment of the invention, a single pole of an electromagnet could be positioned adjacent to a rotating ferromagnetic steel sleeve which coaxially surrounds a stationary, non-ferromagnetic cylindrical shaft. In this alternative embodiment of the invention, the electromagnet would be deenergized at bearing RPM's below which bearing lift-off occurs, such as during starting and stopping, to prevent undesirable bearing surface wear caused by the asymmetric force induced between the two bearing elements by the magnetic force on the ferromagnetic bearing element. After bearing lift-off has been achieved, the electromagnet can be energized to apply the required level of asymmetric force to the ferromagnetic bearing element. Since increased asymmetric loads are required as bearing operating RPM increases, the operating parameters of the electromagnet could be readily controlled to provide increased magnetically-induced asymmetric force levels at higher bearing operating RPM and decreased asymmetric forces at lower bearing operating RPM, as long as the asymmetric force is maintained above the critical minimum level required to eliminate bearing whirl instability.

Numerous additional benefits of the invention are realized in addition to the ability to eliminate bearing whirl instability. For example, the pneumatic load ramp of the present invention will work regardless of the relative direction of rotation of the rotating bearing element relative to the stationary bearing element. In the FIG. 22 embodiment of the invention, the coaxial cylindrical sleeve can be rotated in either a counterclockwise or clockwise direction and the pneumatic load ramp of the present invention will operate satisfactorily. For the clockwise sleeve direction of rotation as shown in FIG. 26, air wedge 226 will form to the left of unrelieved circumferential section 218. For the opposite counterclockwise direction of sleeve rotation, air wedge 226 will form on the right side of circumferential section 218. In other words, air wedge 226 always forms upstream of the airflow designated by reference number 224 created by relative rotation between the rotating bearing element and the stationary bearing element.

Another very significant benefit of the invention is that it operates in a closed system using only air entrapped between the bearing surfaces and does not require a flow of air pumped from a source external to the bearing. Such external air circulation requirements common with prior art bearing systems are highly undesirable since the circulation of air from external sources virtually always transfers particulate contaminants and debris into the critical, close tolerance bearing surface interface, resulting in substantially increased bearing wear leading to shortened bearing life and unpredictable bearing failure modes.

Because the configuration of the pneumatic load ramp of the present invention is not geometrically complex nor are the tolerances highly critical, the pneumatic load ramp can be inexpensively added to existing bearing designs using relatively non-precision tooling and cutting techniques.

Because the asymmetric force created by the pneumatic load ramp of the present invention increases in proportion to increasing bearing operating RPM, a single geometric configuration will function acceptably at highly variable bearing operating speeds, including very high bearing operating speeds.

Although the pneumatic load ramp of the present invention has been specifically illustrated in the drawings as taking the form of a single eccentric annulus, numerous different geometric configurations could readily be implemented by persons of ordinary skill in the bearing design art to create an air wedge or other means for applying an asymmetric load to the bearing at a location fixed relative to a selected bearing element. For example, the pneumatic load ramp could be formed as two, three or more spaced apart elements in either bearing element as shown in FIG. 27. In another alternative embodiment, the pneumatic load ramp could be formed with one ramp in one bearing element and with two spaced apart ramps in the opposing bearing element. Accordingly, it is intended by the appended claims to cover all such modifications of the invention which fall within the true spirit and scope of the invention.

We claim:

1. A method for eliminating whirl instability in a gas-supported bearing including a rotating bearing element, a coaxially aligned stationary bearing element and a bearing midsection, comprising the step of applying an angularly fixed asymmetric load to the rotating bearing element within the bearing midsection where the magnitude of the angularly fixed asymmetric load is adequate to substantially eliminate whirl instability.

2. The method of claim 1 including the step of varying the magnitude of the asymmetric load as a function of bearing rotational velocity to substantially eliminate whirl instability at different bearing rotational velocities.

3. The method of claims 1 or 2 including the step of forming an increased pressure air wedge between the rotating and stationary bearing elements to generate the asymmetric load.

4. The method of claim 3 wherein the air wedge is generated by a pneumatic load ramp located in the stationary bearing element.

5. The method of claim 4 wherein the pneumatic load ramp is formed as an eccentric annulus in the stationary bearing element.

6. The method of claim 4 wherein the gas supported bearing includes:
   a. a cylindrical bearing sleeve having a longitudinal axis and a cylindrical inner surface including a first bearing surface; and
   b. a cylindrical bearing shaft positioned coaxially within the bearing sleeve and having a cylindrical outer surface including a second bearing surface, wherein a relative rotational velocity is established between the bearing sleeve and the bearing shaft to generate a bearing supporting force along a bearing overlap zone wherein the first bearing surface overlaps the second bearing surface, the bearing overlap zone having a defined length along the longitudinal axis.

7. The method of claim 6 wherein the bearing shaft forms the stationary bearing element and wherein the pneumatic load ramp is formed in the bearing shaft.

8. The method of claim 6 wherein:
   a. the cylindrical bearing sleeve includes a first bearing surface with a random surface texture having a first $R_a$ roughness profile; and
   b. the cylindrical bearing shaft includes a random surface texture having a second $R_a$ roughness profile, wherein the sum of the first and second $R_a$ roughness profiles falls within the range of from about eighteen to about sixty.

9. The method of claim 8 wherein the bearing shaft forms the stationary bearing element and wherein the pneumatic load ramp is formed in the bearing shaft.

10. The method of claim 8 wherein the bearing sleeve forms the stationary bearing element and wherein the pneumatic load ramp is formed in the bearing sleeve.

11. A method for eliminating whirl instability in a gas-supported bearing, comprising the steps of:
   a. providing a cylindrical bearing sleeve having a longitudinal axis and a cylindrical inner surface including a first bearing surface;
   b. providing a cylindrical bearing shaft positioned coaxially within the bearing sleeve, separated from the bearing by a gaseous medium, and having a cylindrical outer surface including a second bearing surface;
   c. providing a bearing overlap zone where the first bearing surface overlaps the second bearing surface but is separated from the second bearing surface by the gaseous medium to form first and second spaced apart gas bearings, the bearing overlap zone having a defined length along the longitudinal axis;
   d. forming an angularly fixed pneumatic load ramp in one of the bearing surfaces having a length along the longitudinal axis less than the length of the bearing overlap zone to create a chamber between the first and second bearing surfaces;

e. maintaining the bearing surface having the pneumatic load ramp stationary while rotating the other bearing surface to generate a bearing support force through the gaseous medium along the bearing overlap zone and causing the angularly fixed pneumatic load ramp to generate a load in the gaseous medium within the chamber to apply an angularly fixed asymmetric load through the gaseous medium in the chamber to the bearing assembly at a fixed angular location to eliminate bearing whirl instability, the first and second gas bearings restricting axial flow of the gaseous medium along the longitudinal axis into or out of the chamber.

12. The method of claim 11 wherein the bearing shaft is rotated while the bearing sleeve is maintained stationary and wherein the pneumatic load is located in the bearing sleeve.

13. The method of claim 11 wherein the bearing sleeve is rotated while the bearing shaft is maintained stationary and wherein the pneumatic load ramp is located in the bearing shaft.

14. The method of claims 12 or 13 wherein the pneumatic load ramp includes a longitudinally extending circumferential discontinuity.

15. The method of claim 14 wherein:
a. the first bearing surface includes a random surface texture having a first $R_a$ roughness profile; and
b. the second bearing surface includes a random surface texture having a second $R_a$ roughness profile, wherein the sum of the first and second $R_a$ roughness profiles falls within the range of from about 18 to about 60.

16. The method of claim 14 wherein the length of the pneumatic load ramp is approximately equal to one third of the length of the bearing overlap zone.

17. The method of claim 14 wherein the pneumatic load ramp is formed as an eccentric annulus.

18. The method of claim 14 wherein the circumferential discontinuity is recessed into the bearing surface.

19. The method of claim 18 wherein none of the pneumatic load ramp protrudes beyond the bearing surface.

* * * * *